(12) United States Patent
Kukal et al.

(10) Patent No.: US 8,316,342 B1
(45) Date of Patent: Nov. 20, 2012

(54) METHOD AND APPARATUS FOR CONCURRENT DESIGN OF MODULES ACROSS DIFFERENT DESIGN ENTRY TOOLS TARGETED TO A SINGLE LAYOUT

(75) Inventors: Taranjit Kukal, Delhi (IN); Chris Cheung, Westford, MA (US); Vikas Kohli, Noida (IN); Keith Felton, Sterling, MA (US); Frank X. Farmar, Amherst, NH (US); Steven R. Durrill, Campbell, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 273 days.

(21) Appl. No.: 12/792,325

(22) Filed: Jun. 2, 2010

(51) Int. Cl.
*G06F 17/50* (2006.01)
*G06F 15/04* (2006.01)

(52) U.S. Cl. ........ 716/139; 716/102; 716/103; 716/104; 716/106; 716/125; 716/131; 716/132; 716/136; 703/13; 703/14

(58) Field of Classification Search .................. 716/102, 716/103, 104, 106, 124, 131, 132, 136, 139; 703/13, 14
See application file for complete search history.

(56) References Cited

U.S. PATENT DOCUMENTS

| | | | | |
|---|---|---|---|---|
| 6,467,074 B1 * | 10/2002 | Katsioulas et al. | ............ | 257/207 |
| 6,578,174 B2 * | 6/2003 | Zizzo | ............ | 716/103 |
| 6,714,903 B1 * | 3/2004 | Chu et al. | ............ | 703/19 |
| 6,813,597 B1 * | 11/2004 | Demler | ............ | 703/14 |
| 6,983,432 B2 * | 1/2006 | Hayes | ............ | 716/113 |
| 7,024,660 B2 * | 4/2006 | Andrade et al. | ............ | 717/124 |
| 7,055,113 B2 * | 5/2006 | Broberg et al. | ............ | 716/102 |
| 7,168,041 B1 | 1/2007 | Durrill et al. | | |
| 7,269,809 B2 * | 9/2007 | Shastri et al. | ............ | 716/104 |
| 7,650,585 B1 * | 1/2010 | Miller et al. | ............ | 716/138 |
| 7,657,861 B2 * | 2/2010 | Vorbach et al. | ............ | 716/101 |
| 7,761,828 B2 * | 7/2010 | Miczo | ............ | 716/103 |
| 7,823,116 B2 * | 10/2010 | Chan | ............ | 716/104 |
| 7,836,416 B2 * | 11/2010 | Schubert et al. | ............ | 716/106 |
| 7,921,393 B2 * | 4/2011 | Furnish et al. | ............ | 716/110 |
| 8,117,576 B2 * | 2/2012 | Mossawir et al. | ............ | 716/107 |
| 8,201,130 B1 * | 6/2012 | Kalman et al. | ............ | 716/126 |
| 8,201,137 B1 * | 6/2012 | Bhushan et al. | ............ | 716/139 |
| 2002/0049576 A1 * | 4/2002 | Meyer | ............ | 703/14 |
| 2010/0306729 A1 * | 12/2010 | Ginetti | ............ | 716/124 |
| 2011/0248318 A1 * | 10/2011 | Herbst | ............ | 257/208 |
| 2012/0151431 A1 * | 6/2012 | Huijbregts et al. | ............ | 716/131 |

* cited by examiner

*Primary Examiner* — Helen Rossoshek
(74) *Attorney, Agent, or Firm* — Holland & Knight LLP; Brian J. Colandreo, Esq.; Mark H. Whittenberger, Esq.

(57) ABSTRACT

A method of interconnecting a first plurality of electronic components and a second plurality of electronic components to form an electronic circuit includes exporting a first netlist representing a first interconnection of the first electronic components in a first design entry tool, exporting a second netlist representing a second interconnection of the second electronic components in a second design entry tool, providing at least a first interface from the second plurality to the first plurality in the second design entry tool, populating the first interface through the first design entry tool, and exporting a third netlist representing the first interface from the second plurality to the first plurality from the second design entry tool, wherein the third netlist stitches the first netlist to the second netlist.

28 Claims, 17 Drawing Sheets

| Component List | HDL Die Model |
|---|---|
| 220 | Die_RF |
| 230 | Die_AMS |
| 240 | Die_Cap |
| 250 | Die_BGA |

FIG. 9

METHOD AND APPARATUS FOR CONCURRENT DESIGN OF MODULES ACROSS DIFFERENT DESIGN ENTRY TOOLS TARGETED TO A SINGLE LAYOUT

BACKGROUND OF THE INVENTION

1. Field of the Invention

The embodiments of the invention relate to circuit design, and, more specifically, to design of an electronic circuit. Although embodiments of the invention are suitable for a wide scope of applications, it is particularly suitable for the concurrent design of electronic modules across different design entry tools targeted to a single layout.

2. Discussion of the Related Art

In general, an electronic circuit includes many electronic components and modules (e.g., antennae, transistors, diodes, inductors, capacitors, inverters, logic gates, multiplexers, integrated circuit (IC) chips, field programmable gate arrays (FPGAs) for performing various electronic functions). Each component or module is interconnected in a prescribed manner to respond to input electrical signals and produce other electrical signals according to the desired electronic function performed by the circuit. Some modules, such as ICs, system in a package (SiPs), and printed circuit boards (PCBs), may consist themselves of various interconnected modules or components.

The modules of a circuit are frequently designed by different teams, each team having a specific expertise. Each team will use tools specialized for design in its area, such as a spreadsheet design environment for large pin-count devices like processors and field-programmable gate arrays or a schematic design environment for analog and radio frequency (RF) modules. Each team may have design considerations unique to that team, but the modules should ultimately work together in the circuit layout which meets the requirements of all modules. For example, the layout of analog portions of the circuit is typically guided by considerations including trace thickness, trace separation, and ground loops. The layout of RF portions of circuits is typically guided by considerations of trace shapes, route contours, and metal structures for passives. In contrast, the layout of digital portions of circuits is typically guided by bus routing considerations and signal integrity constraints including route schedules and topologies. The final layout should ensure that various constraints of the circuit are met, such as that the router meets routing schedules and the RF portion meets RF shape routing criteria. However, there is tension between the desire for different teams to work independently and concurrently upon the design of modules of the circuit and the need to satisfy global constraints.

There are several methods for concurrent and independent design and simulation of modules according to the related art. In one method, known as reuse module flow, one team creates a reuse module using that team's preferred design entry tool. Another team imports this module into its own design entry tool as a hierarchical block. However, any change to a reuse module requires complete replacement of the hierarchical block, and therefore constant resynchronization amongst the teams counteracts concurrent and independent work. To allow simulation using reuse modules, netlists must be exchanged in advance across design entry tools, and components of the reuse module must be completely laid out in a separate session before importation into the master layout unless the designer chooses to flatten the modules.

In another related art method for concurrent and independent design and simulation of modules, the layout is physically partitioned in advance for purposes of satisfying global constraints by a separate tool, which is also used for simulation. However, the partitioning and simulation are not driven by the design entry tools used to independently create the layout of the modules. Thus, there is no capability to impose different rule sets for the different partitions during simulation or design.

Mixed signal (IC) flow is another method used for concurrent and independent design and simulation of modules involving an analog portion and a digital portion. Mixed signal IC flow allows separate digital and analog teams to independently work on floor-plan and layout of separate analog and digital ICs, which are later merged onto a single layout. However, the two separate teams are creating separate layouts rather than creating pieces of the same layout, and the layouts are merged after the designing process is complete, rather than merging data at the time of writing to the layout by the design entry tool. In addition, the relationship between the digital and analog section can not be fully modeled by the design entry tools; instead the relationships are defined in verilog which goes into register transfer level (RTL) synthesis to Encounter, much like a reuse flow instead of capturing the full relationship. Another limitation of mixed signal IC flow is that simulation can not be performed across the design entry tools of the two teams. A further limitation to mixed signal IC flow is that it is not applicable to printed circuit boards or systems in packages design flows.

Piecemeal simulation is still another method for concurrent and independent design and simulation of modules. In piecemeal simulation, portions of design created across different design entry tools are manually captured and imported into a design entry tool. Such an approach is limited by the necessity to manually stitch the netlists across the different design entry tools and the tools used to generate the objects captured for importation. Simulation netlists created by piecemeal simulation can not be linked to the final layout.

SUMMARY OF THE INVENTION

Accordingly, embodiments of the invention are directed to method and system for the concurrent design of electronic modules across different design entry tools targeted to a single layout that substantially obviates one or more of the problems due to limitations and disadvantages of the related art.

An object of embodiments of the invention is to provide a method and apparatus in which various teams may independently and concurrently design portions of a single layout using tools optimized for each module's type.

Another object of embodiments of the invention is to provide a method and apparatus in which synchronization of netlists across design entry tools is performed automatically upon modification of the design of any module in the layout.

Another object of embodiments of the invention is to provide a method and apparatus for designing a layout in a modular manner using independent rule sets and features for the different modules depending on the type of that module.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, a method of concurrently generating a layout for an electronic circuit across a plurality of design entry tools includes capturing a first plurality of first electronic components in a first design entry tool; capturing a second plurality of second electronic components in a second design entry tool; providing at least a first interface from the first plurality to the second plurality in the first design entry tool; populating the first interface through the second design entry tool; exporting a first netlist representing a first interconnection of the first electronic components in the layout from the first design entry tool; exporting a second netlist representing a second interconnection of the second electronic components in the layout from the second design entry tool; and exporting a third netlist representing the first interface from the first plurality to the second plurality from the first design entry tool, wherein the third netlist stitches the first netlist to the second netlist.

In another aspect, a method of interconnecting a first plurality of electronic components and a second plurality of electronic components to form an electronic circuit includes exporting a first netlist representing a first interconnection of the first electronic components in a first design entry tool; exporting a second netlist representing a second interconnection of the second electronic components in a second design entry tool; providing at least a first interface from the second plurality to the first plurality in the second design entry tool; populating the first interface through the first design entry tool; and exporting a third netlist representing the first interface from the second plurality to the first plurality from the second design entry tool, wherein the third netlist stitches the first netlist to the second netlist.

In another aspect, a system for generating a layout for an electronic circuit includes a first design workstation having a first capture module that captures a first plurality of first electronic components; a second design workstation having a second capture module that captures a second plurality of second electronic components; a first interface exchange module in the first design workstation that provides at least a first interface from the first plurality to the second plurality; a second interface exchange module in the second design workstation that populates the first interface; a first netlist exporting module in the first design workstation that exports a first netlist representing a first interconnection of the first electronic components in the layout from the first capture module; and a second netlist exporting module in the second design workstation that exports a second netlist representing a second interconnection of the second electronic components in the layout from the second capture module, wherein the first netlist exporting module exports a third netlist representing the first interface from the first plurality to the second plurality to stitch the first netlist to the second netlist.

In another aspect, a computer readable medium stores a set of instructions which, when executed by a computer processing system, causes the computer processing system to process input data representing components of an electronic device to generate a layout for an electronic circuit; the set of instructions includes a first capture section that causes the computer system to capture a first plurality of first electronic components; a second capture section that cause the computer system to capture a second plurality of second electronic components; a first interface exchange section that provides at least a first interface from the first plurality to the second plurality; a second interface exchange section that populates the first interface; a first netlist exporting section that causes the computer system to export a first netlist representing a first interconnection of the first electronic components; and a second netlist exporting section that causes the computer system to export a second netlist representing a second interconnection of the second electronic components, wherein the first netlist exporting section causes the computer system to export a third netlist representing the first interface from the first plurality to the second plurality to stitch the first netlist to the second netlist.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 9 shows an exemplary spreadsheet of the digital partition captured by a spreadsheet design entry tool according to an embodiment of the invention;

DETAILED DESCRIPTION OF THE PREFERRED EMBODIMENTS

Figure 1:
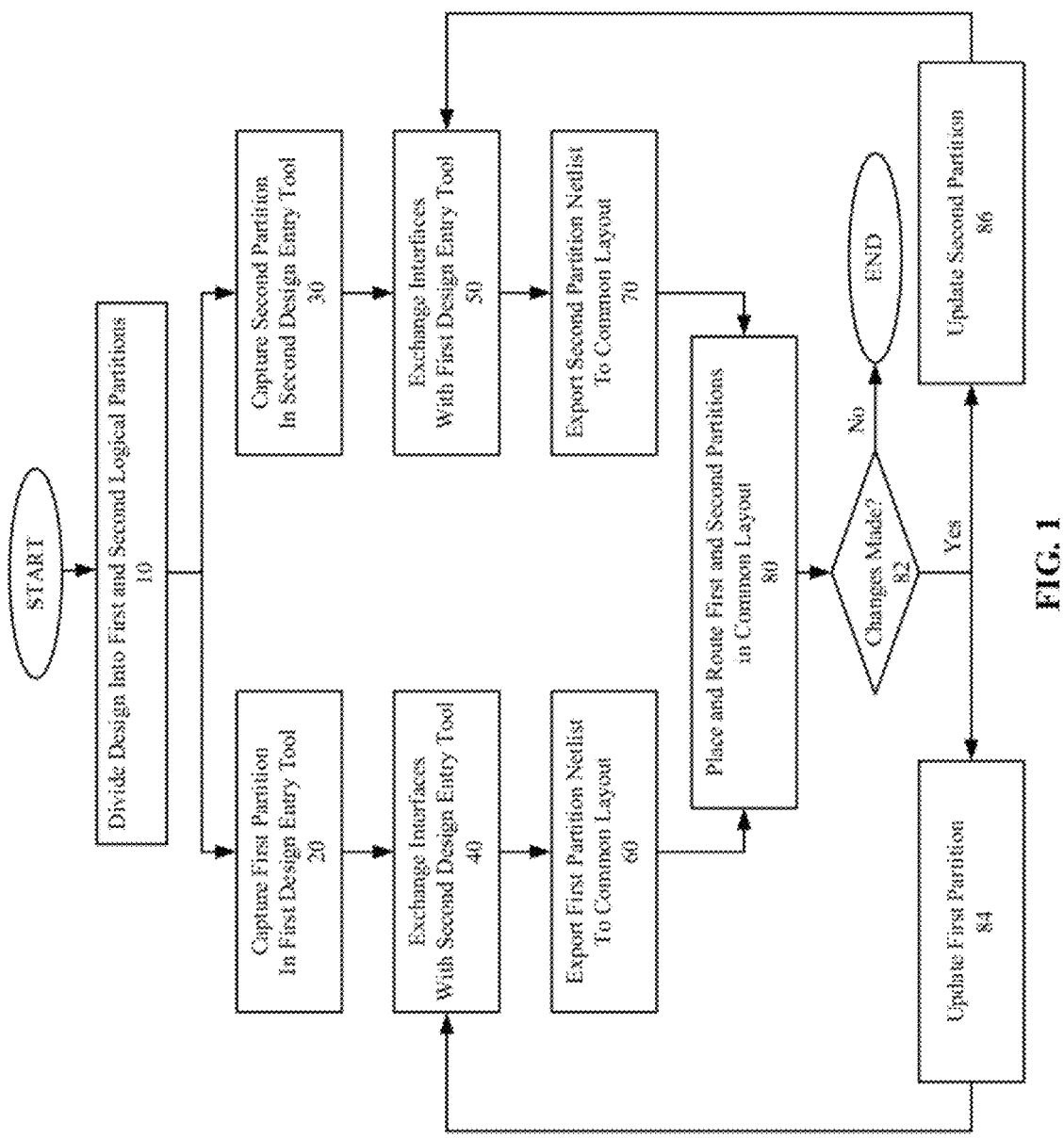
FIG. 1 shows an exemplary flowchart illustrating a method for concurrently designing an electronic circuit across different design entry tools according to an embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 shows an exemplary flowchart illustrating a method for concurrently designing an electronic circuit across different design entry tools according to an embodiment of the invention. Referring to FIG. 1, the design of an electronic circuit is divided into at least first and second logical partitions at an initial design stage 10. At this initial design stage 10, interfaces are defined to provide for connectivity between the first and the second partitions.

Figure 2:
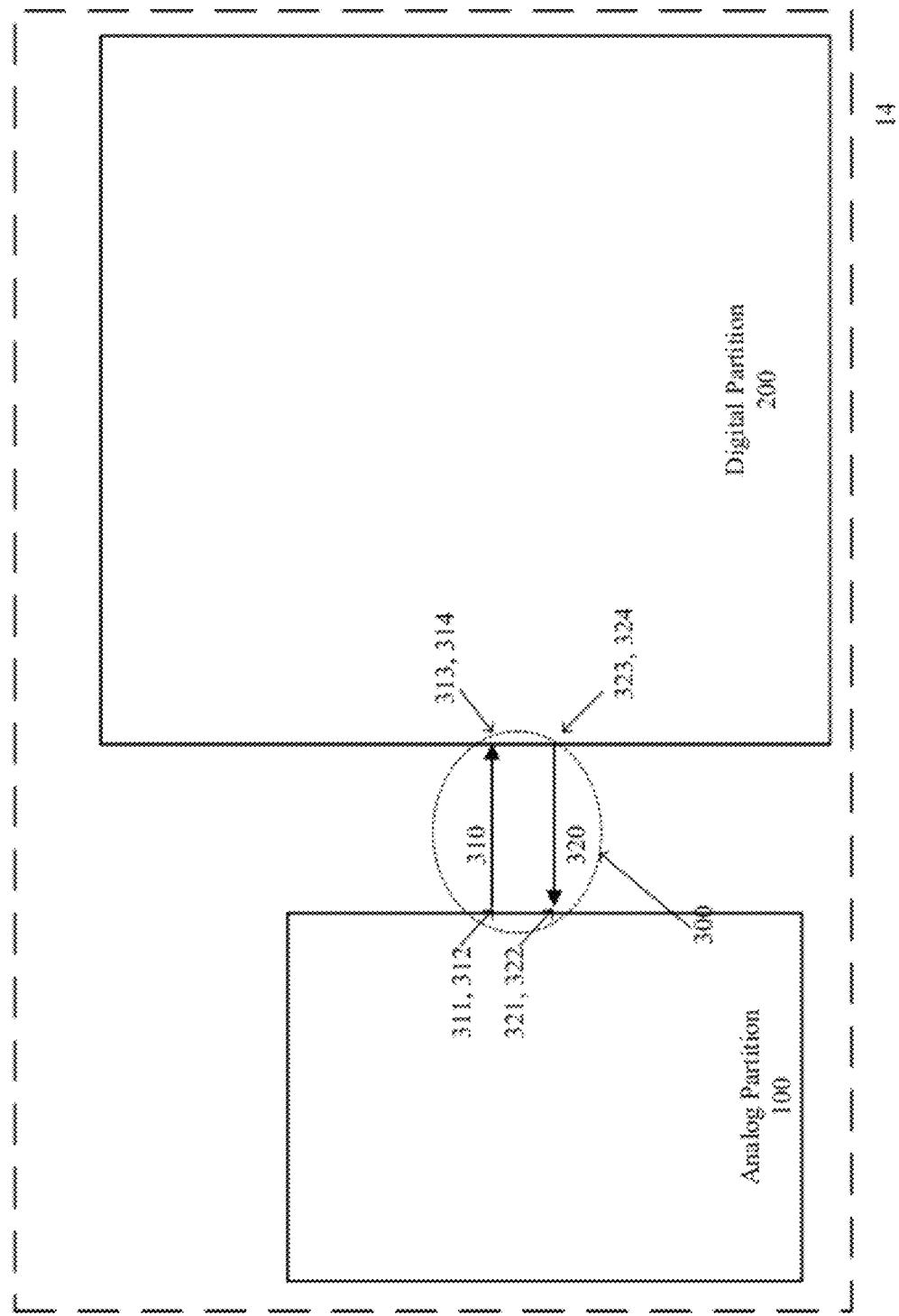
FIG. 2 is a block diagram of an exemplary logical partitioning of the design of a mixed signal SiP circuit according to an embodiment of the invention.

FIG. 2 is a block diagram of an exemplary logical partitioning of the design of a mixed signal SiP circuit according to an embodiment of the invention. Referring to FIG. 2, the design of a mixed signal SiP circuit is logically partitioned, for example, into a first partition that includes an analog portion 100 of the mixed SiP circuit, and a second partition that includes a digital portion 200 of the mixed SiP circuit. The first partition includes, for example, analog modules to be incorporated into the design by an analog design team and to be interconnected to form the analog portion 100 of the mixed SiP circuit. The analog modules may include, for example, antenna, a duplexing switch, and latching networks. The second partition includes, for example, remaining modules that are to be incorporated into the design by a digital design team and to be interconnected to form the digital portion 200 of the mixed SiP circuit. The second partition may include, for example, several integrated circuits (ICs) interconnected via ball-grid-array (BGA) pins.

The analog portion 100 of the mixed SiP circuit may be characterized by a low number of connecting pins between circuit elements and may include transistor level die designs. A schematic design environment may be more suitable for the radio frequency analog portion 100, which are characterized by a relatively low pin count. The schematic design environment provides the advantage of graphical visualization of the interconnection between the analog components of the mixed SiP design for ease in understanding and conceptualizing of the design.

In contrast, the digital portion 200 of the mixed SiP circuit may be characterized by a large number of connecting pins between many different components. The digital portion of the mixed signal SiP may also include other large pin count devices like processors, field programmable gate arrays (FPGA), and memories. A spreadsheet design environment may be more appropriate for the design of the digital portion 200 of the circuit and describe in spreadsheet form the interconnections between the large number of input pins and output pins of the different components in the digital portion 200.

Thus, according to an embodiment of the invention, a circuit is logically partitioned at an initial design stage 10 based upon the different design entry tools the designers of the circuit intend to use to capture the elements of the circuit and specify their interconnections. The circuit is partitioned into separate portions, the elements of each of which can be entered independently by a different design team using design entry tools that are appropriate for the individual separate portions. For example, an analog team will design the layout of the analog partition of the circuit to specify the interconnection of the analog devices forming the analog partition of the circuit, and a digital team will independently design the layout of the digital partition of the circuit to specify the interconnection of the digital devices that form the digital partition of the circuit.

Still referring to FIG. 2, interfaces are defined between the design teams working on the first partition 100 and second partition 200, respectively, to define a partition net 300. The interfaces defined between the first and second partitions 100 and 200 indicate how the modules in the first partition 100 connect to modules in the second partition 200. Modules across partitions may be connected by bond wires, vias, package balls, or some other direct electrical connection, or may traverse a module which transforms the signal.

In the exemplary design of a mixed signal SiP of FIG. 2, the analog partition 100 interfaces with the remainder of the circuit via two separate connections that form the partition net 300. In a first connection, the analog partition 100 is to be connected via bond wires 310 to provide input signals to the digital partition 200. In a second connection, the analog partition 100 will receive output signals from the digital portion 200 via the bond wires 320.

Thus, a first interface generated for the analog partition 100 specifies, for example, output ports 311 and 312 from the analog partition 100 for transmitting the input signals through the bond wires 310 to the digital partition 200 and input port 321 and 322 for receiving the output signal from the digital partition 200 through the bond wires 320. Similarly, a second interface generated for the digital partition 200 specifies, for example, input ports 313 and 314 to the digital partition 200 for receiving the input signals from the analog partition 100 on the bond wires 310 and output ports 323 and 324 from the digital partition 200 for transmitting the output signals to the analog portion 100 through the bond wires 320. The first and second interfaces from the analog partition 100 and the digital partition 200, respectively, can be merged into the partition net 300 in the form of a netlist that specifies the output and input ports 311, 312, 321 and 322 from the analog partition 100, the input and output ports 313, 314, 323 and 324 from the digital partition 200 and the interconnection between the analog output ports 311, 312 to the digital input ports 313 and 314, and the interconnection between the analog input ports 321 and 322 and the digital output port 323 and 324.

Constraints are merged across front ends by resolving constraints applied on the partition net 300 by the different design entry tools. For example, any constraint applied on the partition net 300 in the schematic design entry tool associated with the analog partition 100 is resolved against any conflicting constraint applied on the partition net 300 in the spreadsheet design entry tool associated with the digital partition 200.

Thus, according to an embodiment of the invention, design teams working on respective partitions exchange interfaces to indicate how the modules designed or that will be designed by one design team will interconnect to the modules designed or that will be designed by other design teams in their respective design entry tools. The interfaces between the partitions are decided upon at the time that the circuit is divided into logical partitions. A partition net is generated by one or more of the design entry tools to describe the interface by specifying the output and input ports from the analog partition 100, the corresponding input and output ports from the digital partition 200, and the interconnection between the analog input and output ports to the digital output and input ports, respectively.

Referring back to FIG. 1, the design of the electronic circuit includes a first capture stage 20 for capturing the first partition in the first design entry tool. At this first capture stage 20, the first electronic components that constitute the first partition are entered in the first design entry tool. Then, the first electronic components are interconnected to complete the first partition.

Figure 3:
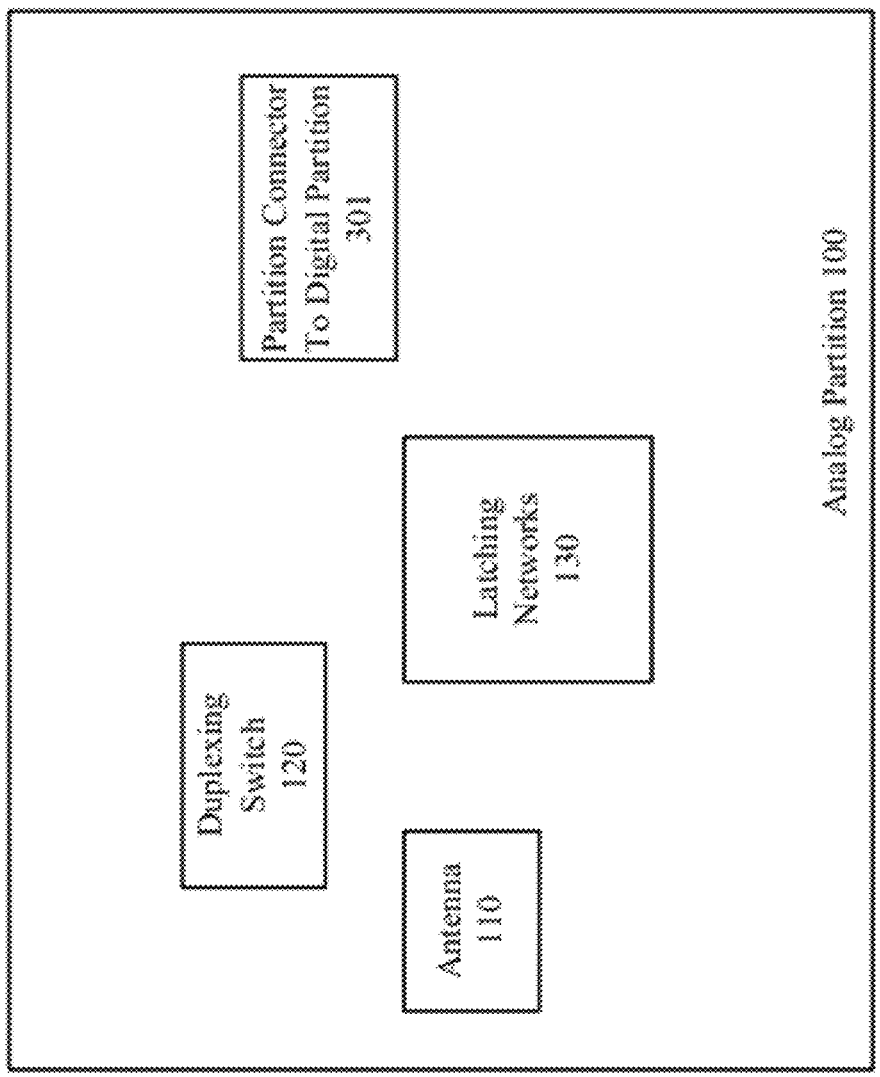
FIG. 3 is an exemplary block diagram of the analog partition of the mixed signal SiP circuit according to an embodiment of the invention.

FIG. 3 is an exemplary block diagram of the analog partition of the mixed signal SiP circuit according to an embodiment of the invention. Referring to FIG. 3, the analog modules that form the analog partition 100 of the mixed signal SiP circuit are entered using the appropriate design entry tool for the analog partition 100. The analog modules in the analog partition 100 may include an input/output section 110, a duplexing switch 120, and latching networks 130.

At this stage, attributes for the analog partition are defined and finalized in accordance with the desired design entry tool.

A partition connector 301 is also created for the analog partition 100 to represent in symbolic form the interface for connecting the analog portion of the design to the digital portion of the design. Here, the partition connector 301 represents the interface between the output and input ports from the analog partition 100 and the corresponding input and output ports from the digital partition 200. The corresponding partition net 300 can also be populated at this stage in the selected design entry tool for the analog partition 100.

Referring back to FIG. 1, the design of the electronic circuit includes a second capture stage 30 for capturing the second partition in the second design entry tool. The second capture stage 30 may occur concurrently with the first capture stage 20. At this second capture stage 30, the second electronic components that constitute the second partition are entered in the second design entry tool. Then, the second electronic components are interconnected to complete the second partition.

Figure 4:
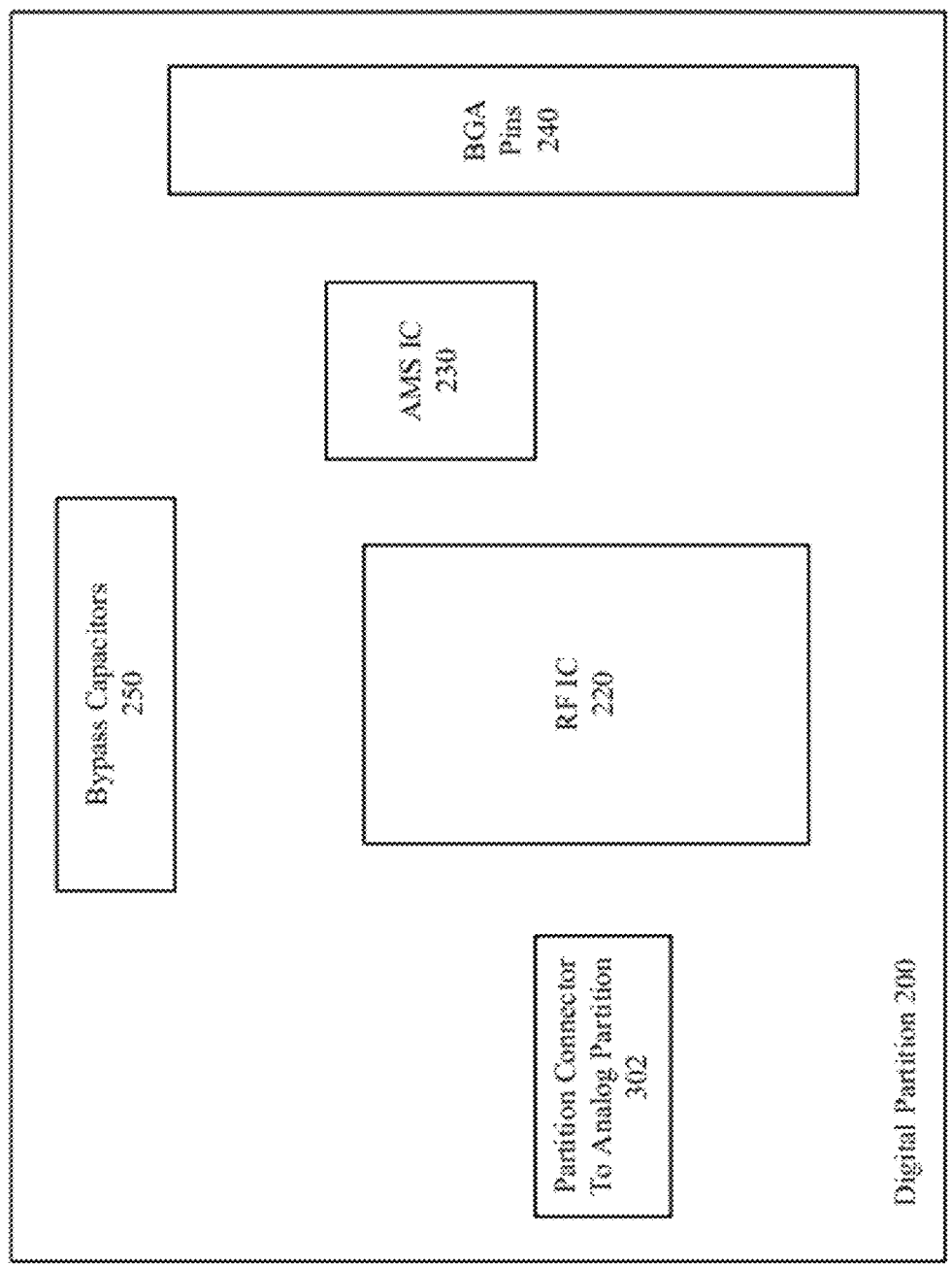
FIG. 4 is an exemplary block diagram of the digital partition of the mixed signal SiP circuit according to an embodiment of the invention.

FIG. 4 is an exemplary block diagram of the digital partition of the mixed signal SiP circuit according to an embodiment of the invention. Referring to FIG. 4, the digital design team enters the elements in the digital partition 200 from the mixed signal SiP circuit using, for example, a spreadsheet-style design entry tool as a second design entry tool. The digital partition 200 is captured in the spreadsheet-style design entry tool by listing the components that form the digital portion 200 of the mixed SiP circuit, including a RF IC 220, an analog mixed signal (AMS) IC 230, BGA pins 240 to be connected to input/output ports of the AMS IC 230, and bypass capacitors 250 to be interposed between the RF IC 220 and other embedded devices (not shown). Further, constraints on the interconnection of the digital components are entered and finalized.

As shown in FIG. 4, a partition connector 302 is also generated to represent in symbolic form the interface for connecting the digital portion of the design to the analog portion of the design. The partition connector 302 represents the interface between the output and input ports from the analog partition 100 and the corresponding input and output ports from the digital partition 200. The corresponding partition net 300 can also be populated at this stage in the selected design entry tool for the digital partition 200.

Referring back to FIG. 1, the design of the electronic circuit includes a first interface exchange stage 40 for exchanging interfaces from the first design entry tool to the second entry tool and a second interface exchange stage 50 for exchanging interfaces from the second design entry tool to the first design entry tool. At the first interface exchange stage 540, the first design exports a second-to-first interface to the second design entry tool. Reciprocally, at the second interface exchange stage 550, the second design entry tool imports the second-to-first interface into the second partition.

In yet another embodiment, at the interface exchange stage 550, the second design entry tool exports the first-to-second interface to the first design entry tool. Reciprocally, at the interface exchange stage 540, the first design entry tool imports the first-to-second interface from the second design entry tool into the first partition.

At the first interface exchange stage 40, the first design exports a second-to-first interface to the second design entry tool and imports a first-to-second interface from the second design entry tool into the first partition. Reciprocally, at the second interface exchange stage 50, the second design entry tool exports the first-to-second interface to the first design entry tool, and imports the second-to-first interface into the second partition.

Figure 5:
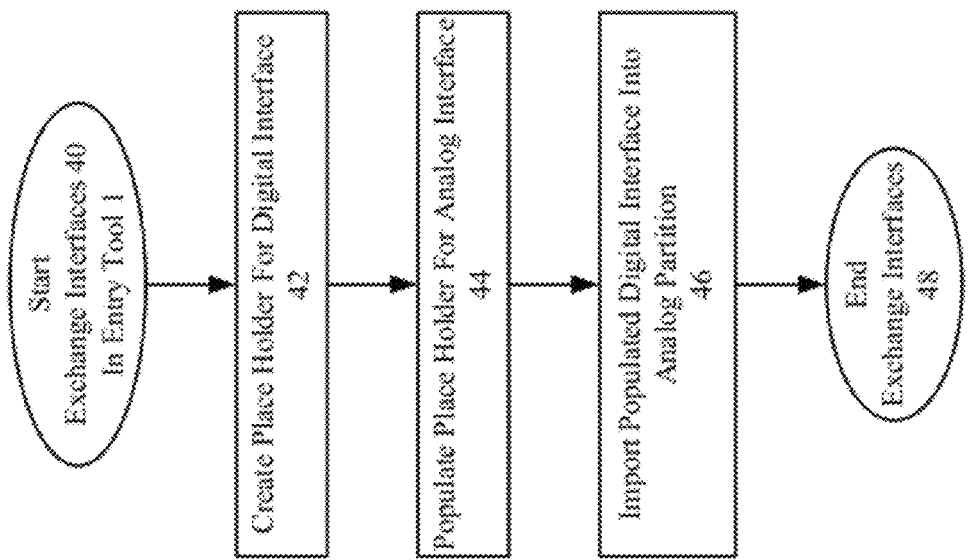
FIG. 5 is an exemplary flowchart of a process of exchanging interfaces between two logical partitions according to an embodiment of the invention.

FIG. 5 is an exemplary flowchart of a process of exchanging interfaces between two logical partitions according to an embodiment of the invention. Referring to FIG. 5, at a first step 42 at the interface stage 40, the first design entry tool generates a place holder for the digital interface in the first entry tool to connect with the digital partition. The place holder for the digital interface may include, for example, a shared memory area accessible to both the first and the second design entry tools and is symbolically represented by the partition connector to digital partition 301 in FIG. 3.

At a second step 44 in the interface exchange stage 40, the first design entry tool populates a corresponding place holder for the analog interface created for the digital partition in the second design entry tool. The place holder for the analog interface is symbolically represented by the partition connector to analog partition 302 in FIG. 4.

At a third step 46 in the interface exchange stage 40, the first design entry tool imports the then-populated digital interface into the analog partition 100 to complete the design of the analog partition 100. At this design stage 406, the first design entry tool has all the information needed to complete the analog partition 100 including the partition connector to digital partition 301.

Figure 6:
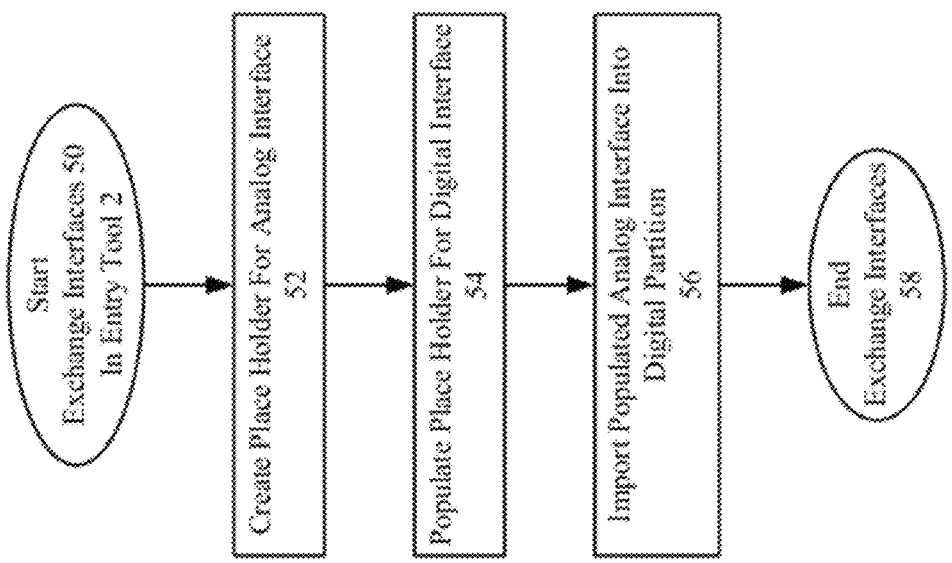
FIG. 6 is another exemplary flowchart of a process of exchanging interfaces between two logical partitions according to another embodiment of the invention.

FIG. 6 is another exemplary flowchart of a process of exchanging interfaces between two logical partitions according to another embodiment of the invention. Referring to FIG. 6, at a first step 52 of the second interface exchange stage 50, the second design entry tool generates a place holder for the analog interface in the second entry tool to connect with the analog partition. The place holder for the analog interface may include, for example, a shared memory area accessible to both the first and the second design entry tools and is symbolically represented by the partition connector to analog partition 302 in FIG. 4.

At a second step 54 of the second interface exchange stage 50, the second design entry tool populates a corresponding place holder for the digital interface generated for the analog partition in the first design entry tool. The place holder for the digital interface is symbolically represented by the partition connector to digital partition 301 in FIG. 3.

At a third step 56 of the second interface exchange stage 50, the second design entry tool imports the then-populated analog interface into the digital partition 200 to complete the design of the digital partition 200. At the third step 56, the second design entry tool has all the information needed to complete the digital partition 200 including the partition connector to analog partition 302.

Referring back to FIG. 1, the design of the electronic circuit includes a first netlist export stage 60 for exporting a first netlist of the first partition to a common layout. At the first netlist export stage 60, the first electronic components that constitute the first partition have been interconnected in the first design entry tool. The first netlist exported by the first partition is a representation of the interconnection of the first electronic components in the first partition.

Figure 7:
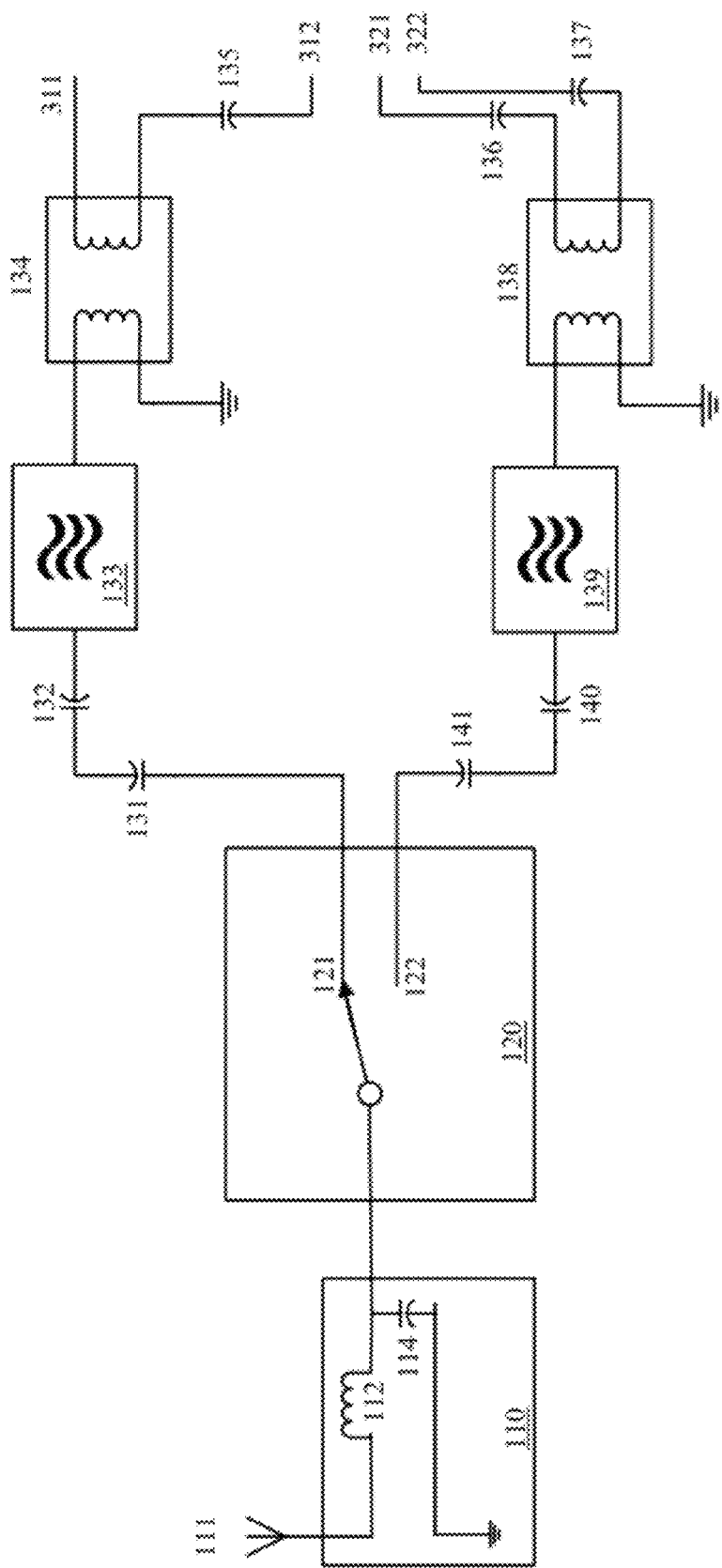
FIG. 7 is an exemplary schematic diagram of the analog partition captured by a schematic design entry tool according to an embodiment of the invention.

FIG. 7 is an exemplary schematic diagram of the analog partition captured by a schematic design entry tool according to an embodiment of the invention. Referring to FIG. 7, the interconnections between the different analog modules are also entered, for example, using a schematic design entry tool as the first design entry tool. An analog signal from an antenna 111 in the input/output section 110 may be wired to the duplexing switch 120 through an RC-filter that includes one or more inductor 112 and one or more capacitor 114. The duplexing switch 120 may include a transmit port 121 connected to an input portion of the latching network 130 via a capacitor 131 and a receive port 122 connected to an output portion of the latching network 130 via a capacitor 141. The input portion of the latching networks 130 may include capacitor 132, a band-pass filter 133, a balun 134 and capacitor 135. The output portion of the latching network 130 may include an interconnection of capacitors 136 and 137, a balun 138, a band-pass filter 139 and capacitor 140. The output portion of the latching network may further include capacitor connected to the receive port 122 of the duplexing switch 120.

Figure 8:
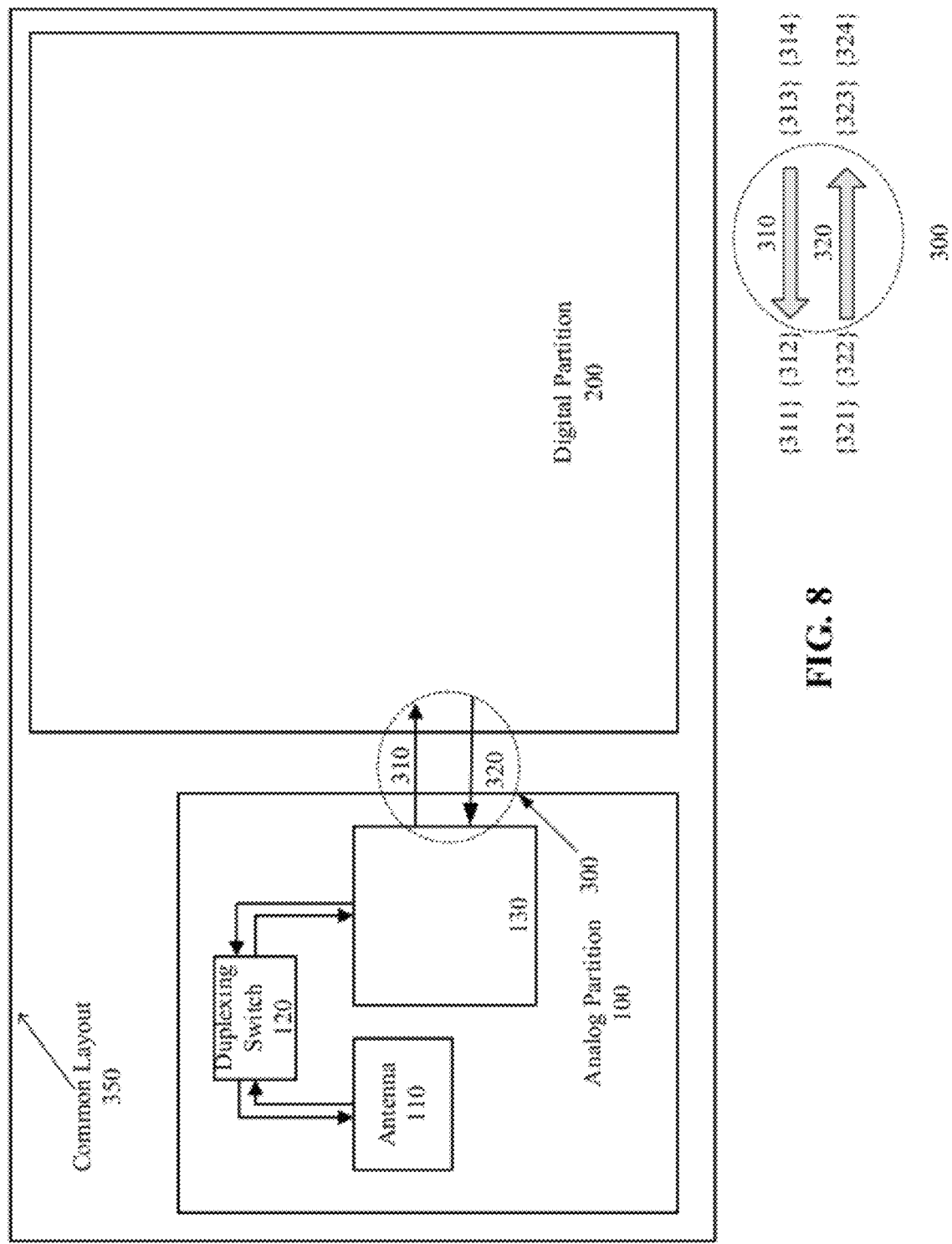
FIG. 8 is an exemplary block diagram of a partial layout representing the analog partition exported by a first design entry tool according to an embodiment of the invention.

FIG. 8 is an exemplary block diagram of a partial layout representing the analog partition exported by a first design entry tool according to an embodiment of the invention. Referring to FIG. 8, the analog partition 100 can be exported asynchronously to a common layout 350 indicating where the analog modules are placed and how the analog modules are interconnected. The schematic design entry tool may export a netlist of the analog partition 100 describing the different modules that are included in the analog partition 100 and their interconnections as entered through the schematic design entry tool. The digital partition 200 is represented in this initial common layout 350 by an empty block to signify that the components of the digital partition 200 have not been exported by the digital team. The common layout 350 may be specified using any format used to specify schematics of a circuit.

The first design entry tool may also export the partition net 300 to the common layout 350 in the form of a netlist that specifies the output and input ports 311, 312, 321 and 322 from the analog partition 100 and the input and output ports 313, 314, 323 and 324 from the digital partition 200. The first design tool may additionally specify which of the analog modules in the analog partition 100 are connected to the analog output ports 311 and 312 and to the analog input ports 321 and 322. For example, referring to FIG. 7, one output 311 of the balun 134 may be connected to one of the first bond wires 310 and an output 312 of the capacitor 135 may be connected to another one of the first bond wires 310. Similarly, one input 321 of the capacitor 136 may be connected to one of the second bond wires 320 and an input 322 of the capacitor 137 may be connected to another one of the second bond wires 320.

Thus, the first design tool may export netlist information specifying that the latching networks 130 in the analog partition 100 are connected via the bond wires 310 to transmit input signals to the input ports 313 and 314 of the digital partition 200. Moreover, the first design tool may specify that the latching networks 130 in the analog partition 100 are connected to bond wires 320 to receive output signals from the digital partition 200 via the bond wires 320 to be transmitted to the input/output section 110 through the duplexing switch 120. Here, the digital components connected to the input and output ports 313, 314, 323 and 324 in the digital partition 200 are not specified until the second design tool corresponding to the digital partition 200 exports their interfaces to the common layout 350.

Referring back to FIG. 1, the design of the electronic circuit includes a second netlist export stage 70 for exporting a second netlist of the second partition to the common layout. At this stage 70, the second electronic components that constitute the second partition have been interconnected in the second design entry tool. The second netlist exported by the second partition is a representation of the interconnection of the second electronic components in the second partition.

FIG. 9 shows an exemplary spreadsheet of the digital partition captured by a spreadsheet design entry tool according to an embodiment of the invention. Referring to FIG. 9, the different electronic components in the digital partition 200 are entered in a table listing each of the components and a corresponding hardware description language (HDL) die model for each of the component. For example, the RF IC 220 is represented in the table by the numeral 220 having a corresponding Die_RF HDL model. Similarly, the AMS IC 230 is represented in the table by numeral 230 which associated with corresponding HDL die model Die_AMS. Similar entries are listed for the other electronic modules in the digital partition 200.

Figure 10:
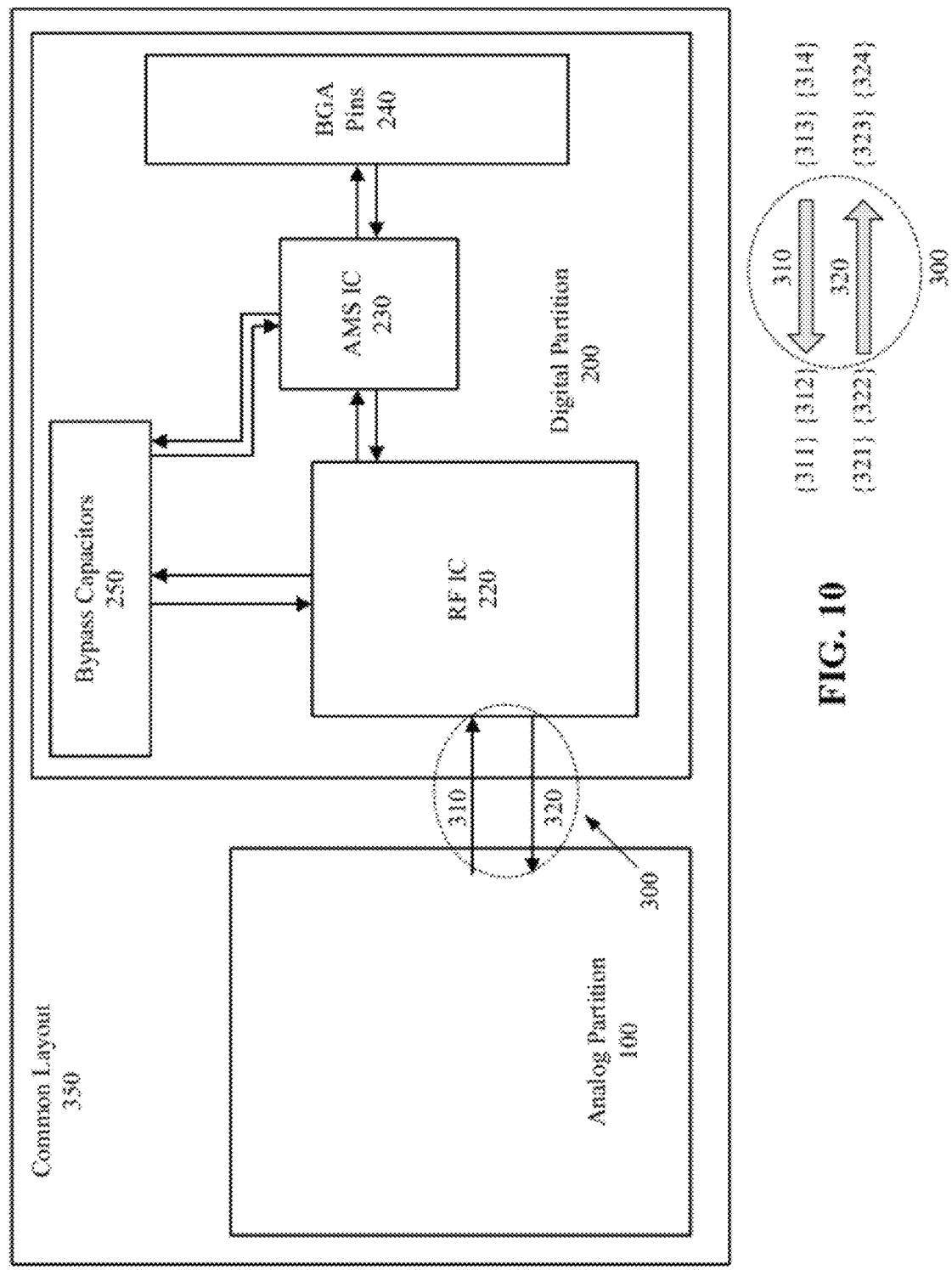
FIG. 10 is an exemplary block diagram of a partial layout representing the digital partition exported by a second design entry tool according to an embodiment of the invention.

FIG. 10 is an exemplary block diagram of a partial layout representing the digital partition exported by the second design entry tool according to an embodiment of the invention. Referring to FIG. 10, the interconnections of the components that form the digital portion 200 of the mixed SiP circuit are also specified in the spreadsheet-style design entry tool. For example, the output pins from the RF IC 220 are connected to input pins corresponding to analog-to-digital converters (ADC) within the AMS IC 230. Similarly, output pins from digital-to-analog converters (DAC) within the AMS IC 230 are connected to input pins of the RF IC 220.

The AMS IC 230 receives control signals on input pins leading to a serial bus control interface therein (not shown). The control signals are outputted at output pins of the AMS IC 230, for example, toward the embedded devices through one or more of the bypass capacitors 250. The AMS IC 230 outputs digital signals generated by the analog-to-digital converters (ADCs) through output pins thereof to other components connected to first corresponding one of the BGA pins 240. The AMS IC 230 also receives digital signals generated by the other components through second corresponding ones of the BGA pins 240. The bypass capacitors 250 also provide a path between the AMS IC 230 and one or more of the other embedded devices (not shown).

The digital partition 200 can be exported asynchronously to the common layout 350 by exporting a netlist indicating where the digital modules are placed and how the digital modules are interconnected each with the other. The spreadsheet-style design entry tool may export a netlist of the digital partition 200 describing the different digital modules that are included in the digital partition 200 and their interconnections as entered through the spreadsheet design entry tool. The analog partition 100 is represented in this initial common layout 350 by an empty block to signify that that the analog components of the analog partition 100 have not been exported to the common layout 350 by the analog team.

The spreadsheet-style design entry tool may also export the partition net 300 to the common layout 350 in the form of a netlist that specifies the output and input ports 311, 312, 321 and 322 from the analog partition 100 and the input and output ports 313, 314, 323 and 324 from the digital partition 200. The spreadsheet-style design entry tool may additionally specify which of the digital modules in the digital partition 200 are connected to the digital input ports 313 and 314 and to the digital output ports 323 and 324. For example, the spreadsheet-style design entry tool may export netlist information specifying that the RF IC 220 in the digital partition 200 are connected to the input ports 313 and 314 to receive input signals from the analog partition 100 via the bond wires 310. Moreover, the second design tool may export netlist information specifying that the RF IC 220 is connected to the output ports 323 and 324 of the digital portion 200 to transmit output signals via the bond wires 320 to the analog partition 100. Here, the analog components connected to the output and input ports 311, 312, 321 and 322 on the analog partition 100 are not specified until the schematic design tool corresponding to the analog partition 100 exports their interfaces to the common layout 350.

Figure 11:
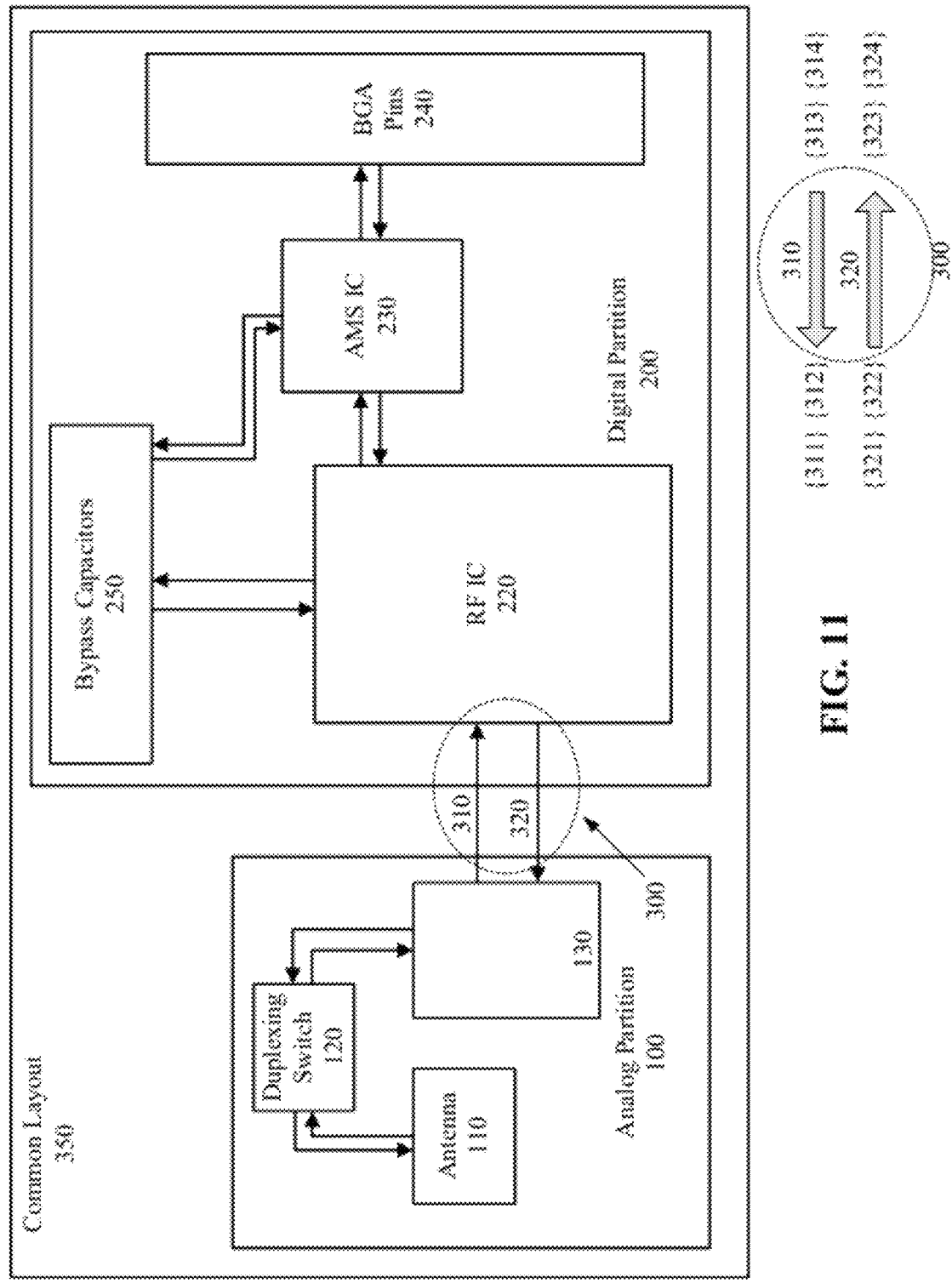
FIG. 11 is an exemplary block diagram of a common layout of the analog and digital partition exported by first and second design entry tools according to an embodiment of the invention.

FIG. 11 is an exemplary block diagram of a common layout of the analog and digital partition exported by first and second design entry tools according to an embodiment of the invention. Referring to FIG. 11, the analog partition 100 of the mixed SiP circuit is exported asynchronously to the common layout 350 indicating where the analog modules are placed and how the analog modules are interconnected. Similarly, the digital partition 200 is exported asynchronously to the common layout 350 indicating where the digital modules are placed and how the digital modules are interconnected. The spreadsheet design entry tool corresponding to the digital partition 200 and the schematic entry tool corresponding to the analog partition 100 export their corresponding interfaces to the common layout 350 to fully specify the partition net 300 that describes how the analog partition 100 and the digital partition 200 are interconnected to each other.

Thus, the schematic design entry tool may export asynchronously a first netlist of the analog partition 100 describing the different modules that are included in the analog partition 100 and their interconnections as entered through the schematic design entry tool. Then, the schematic design entry tool exports to the common layout 350 the partition net 300 in the form of a netlist that specifies the output and input ports 311, 312, 321 and 322 from the analog partition 100 and the input and output ports 313, 314, 323 and 324 from the digital partition 200. Moreover, the schematic design tool outputs netlist information specifying that the latching networks 130 in the analog partition 100 are connected via the bond wires 310 to transmit input signals to the input ports 313 and 314 of the digital partition 200. Furthermore, the schematic design entry tool specifies that the latching networks 130 in the analog partition 100 are connected to bond wires 320 to receive output signals from the digital partition 200 via the bond wires 320 to be transmitted to the input/output section 110 through the duplexing switch 120.

The schematic and spreadsheet design entry tools may export different design rule checks for the placement of the analog partition 100 and the digital partition 200, respectively. The schematic design entry tool may export floorplan and route capabilities that are specific to the analog partition 100. For example, the schematic design entry tool may incorporate RF shape routing capability that are specific to the analog components but not usable in the routing of digital components of the mixed SiP circuit. Similarly, the spreadsheet design entry tool may enable signal integrity check for the digital netlist. Thus, the placement and layout tool may use different floorplan and route rules for components in different partitions, including the analog partition 100 and the digital partition 200.

Similarly, the spreadsheet-style design entry tool exports asynchronously a second netlist of the digital partition 200 describing the different modules that are included in the digital partition 200 and their interconnections as entered through the spreadsheet design entry tool. Then, the spreadsheet design entry tool also exports to the common layout 350 its version of the partition net 300 in the form of a netlist that specifies the output and input ports 311, 312, 321 and 322 from the analog partition 100 and the input and output ports 313, 314, 323 and 324 from the digital partition 200. Moreover, the spreadsheet design tool may export netlist information specifying that the RF IC 220 in the digital partition 200 are connected to the input ports 313 and 314 to receive input signals from the analog partition 100 via the bond wires 310. Furthermore, the spreadsheet design tool may export netlist information specifying that the RF IC 220 is connected to the output ports 323 and 324 of the digital portion 200 to transmit output signals via the bond wires 320 to the analog partition 100.

Thus, the partition net 300 exported by the first and second design entry tools corresponding to the analog partition 100 and digital partition 200, respectively, specifies the output and input ports 311, 312, 321 and 322 from the analog partition 100, the input and output ports 313, 314, 323 and 324 from the digital partition 200 and the interconnection between the analog output ports 311 and 312 to the digital input ports 313 and 314, and the interconnection between the analog input ports 321 and 322 and the digital output port 323 and 324. For example, in a first connection, the latching networks 130 in the analog partition 100 are connected via the bond wires 310 to the RF IC 220 in the digital partition 200 to transmit input signals to the RF IC 220. In a second connection, the latching networks 130 in the analog partition 100 receive output signals from the RF IC 220 in the digital portion 200 via the bond wires 320 to be transmitted to the input/output section 110 through the duplexing switch 120. Hence, the first and second netlists exported for the analog partition 100 and the digital partition 200, respectively, are stitched by the partition net 300, thereby providing the complete common layout 350 for the mixed SiP circuit.

According to an embodiment of the invention as shown in FIG. 1, the placement and routing in the common layout 350 is performed by a separate layout team using a layout tool. Thus, the layout tool may pull the netlists for the first and second partitions 100 and 200 and for the partition connector 300 from a shared memory location written to by the first and second design entry tools. Alternatively, the layout tool may pull the information by sending requests to the first and second design tools to return their respective netlists for the analog and digital partitions 100 and 200.

According to embodiments of the invention, a circuit can be designed by partitioning into logical partitions based upon functional characteristics of the sections of the circuit in the target layout including, for example, the type of design entry tools to be used in the respective partitions. Any module of the circuit will be in at most one partition. So, if the design of any one partition is entrusted to only a single design team at any one time, a plurality of design teams may concurrently work on the respective non-overlapping portions of the layout.

Thus, the different design teams can design different modules of the same layout simultaneously, and asynchronously write to the common layout without interfering with the design of another team's portion of the layout. By exchanging a partition net describing the interconnection between the respective partitions, netlists exported by the different teams to the common layout can be stitched together by the netlist corresponding to the partition net.

Referring back to FIG. 1, the design of the electronic circuit includes a placing and routing stage 80 for placing and routing the first and second partitions in the common layout. At this stage 80, the common layout resulting from the first and second design entry tools can be processed using a placement and routing tool to place the first and second electronic components and route the wires interconnecting the first and second electronic components. Each of the first and second electronic components can be placed anywhere in the common layout and routed without regard to whether the component came from the first partition or from the second partition.

Figure 12:
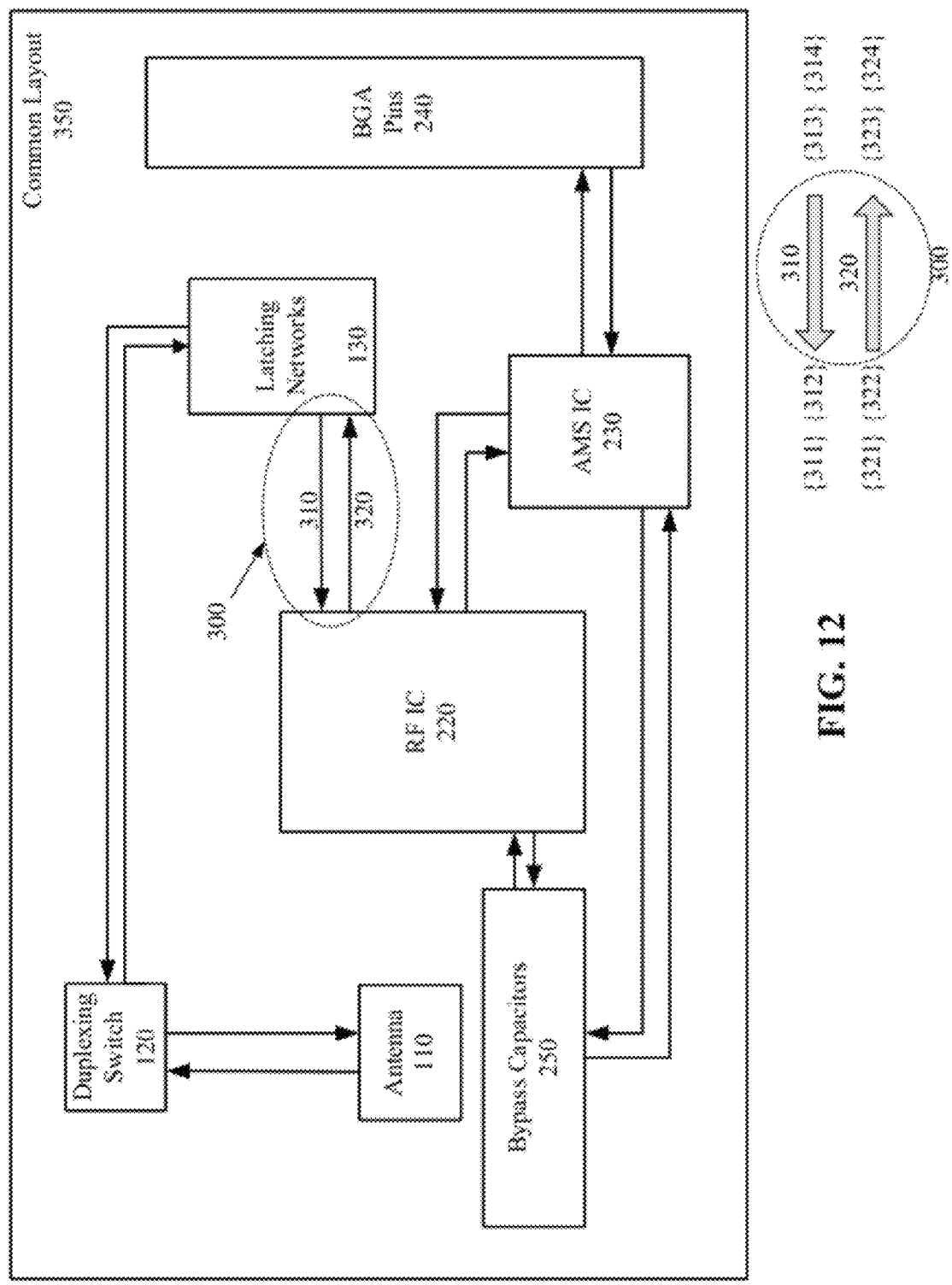
FIG. 12 is an exemplary block diagram of a placement and routing of a common layout of the mixed signal SiP circuit of FIG. 11 according to an embodiment of the invention.

FIG. 12 is an exemplary block diagram of a placement and routing of a common layout of the mixed signal SiP circuit of FIG. 11 according to an embodiment of the invention. Referring to FIG. 12, the analog and digital components included in the mixed signal SiP circuit exported by the first and second design entry tools can be placed and routed using a placement and routing tool. The placement and routing tool will decide on the location of the different analog and digital components on the mixed SiP circuit. The placement and routing tool will also complete the pin assignment for the IC modules taking into consideration for how the placement of the IC modules might affect or be affected by the placement and routing of other components on the mixed SiP circuit. For example, the placement and routing tool may modify the location of the input/output section 110 and of the duplexing switch 120 on the common layout 350. Moreover, the placement and routing tool may change the routing of interfaces between the latching networks 130 and the RF IC 323, between the RF IC 220 and the AMS IC 230, and between AMS IC 230 and the BGA pins 240, for example. Furthermore, the placement and routing tool may change the shape of the wiring between the AMS IC 230 and the bypass capacitors 250 to improve routability. The placement and routing may also swap pins within anyone of the AMS IC 230 and the RF IC 220 to further improve routability.

Referring back to FIG. 1, the design of the electronic circuit includes a layout synchronization stage 82 to perform a layout-versus-schematic synch up of the first and second partitions with the common layout. At this stage 82, each of the first and second design entry tools checks whether the placement and routing processes have changed instances of any of the first and second electronic components, or changed connectivity between any of the first and second electronic components in the common layout. If any change is detected at design stage 82, the first design entry tool updates the first partition at a first update stage 84 to reflect instances and connectivity changes in the first partition from the common layout. Similarly, the second design entry tool updates the second partition at a second update stage 86 to reflect instances and connectivity changes in the second partition from the common layout.

The updating of any of the first and second partitions at design stages 84 and 86 may include entering new electronic components into any of the first and second partitions. Thus, the design flow may proceed thereafter with repeating the design stages 40 and 60 in the first design entry tool or design stages 50 and 70 in the second design entry tool to exchange interfaces and export the corresponding partition. Then, a new common layout may be generated at design stage 80 to incorporate any design changes made in any one of the first and second partitions.

Thus, referring back to FIG. 12, subsequent to placement and routing of the common layout 350, the schematic design entry tool and the spreadsheet design entry tool perform a layout synchronization of their respective schematics with respect to the corresponding portion of the design in the common layout 350. The schematic design entry tool imports the changes to the analog partition 100 resulting from the placement and routing of the common layout 350. For example, the schematic design entry tool updates the schematic of the analog partition 100 to incorporate the modifications in the location of the input/output section 110 and of the duplexing switch 120 in the common layout 350 following placement and routing. Moreover, the schematic design entry tool updates the schematic of the analog partition 100 to incorporate changes to the routing of interfaces between the latching networks 130 and the digital partition 200.

Similarly, the spreadsheet design entry tool imports the changes to the digital partition 200 resulting from the placement and routing of the common layout 350. For example, the spreadsheet design entry tool updates the schematic of the digital partition 200 to incorporate the changes in the routing of interfaces between the latching networks 130 and the RF IC 323, between the RF IC 220 and the AMS IC 230, and between AMS IC 230 and the BGA pins 240, for example. Moreover, the spreadsheet design entry tool updates the schematic of the digital partition 200 to incorporate the changes in the shape of the wiring between the AMS IC 230 and the bypass capacitors 250 following the placement and routing process. Furthermore, the spreadsheet design entry tool updates the schematic of the digital partition 200 to incorporate any swapping of pins within the AMS IC 230 and the RF IC 220 following the placement and routing process.

According to an embodiment of the invention, the placement and routing tool include solvers that extract layout parasitics from the common layout 350. These layout parasitics are annotated to the common layout 350 by the placement and routing tools. Thus, the layout synchronization stage 82 includes back-annotating of the layout parasitics to the first and second partitions. If any layout parasitics is available at design stage 82, the first design entry tool back-annotates the first partition at the first update stage 84 to incorporate the parasitics from the common layout 350 into the first partition. Similarly, the second design entry tool back-annotates the second partition at the second update stage 86 to incorporate the parasitics from the common layout 350 into the second partition.

According to an embodiment of the invention, each partition to have different design rule checks may be applied to each partition depending upon desired properties for the partition. For example, the specifications for a digital layout partition may call for an allowable minimum trace thickness of 10 mil, whereas a power electronic analog partition may require a minimum trace thickness of 30 mil. A digital partition could have a signal integrity check enabled on the digital nets, whereas an analog partition would have RFShape routing capability. Thus, different design rule checks can be used in different partitions to implement thereby applying different floorplan or route capabilities and rules to the partitions.

The methods described above can be implemented on a computer system to automate the concurrent design of an electronic circuit across different design entry tools according to an embodiment of the invention. For example, the methods can be implemented as a computer program including a set of instructions written in a high level programming language executable on a computer or a computer system. The computer program can be provided in a computer readable medium that can be read by a computer or computer system to be loaded into an internal memory (e.g. RAM) of the computer or computer system. Then, one or more processor of the computer or computer system can execute the program loaded into the internal memory thereof to perform the tasks described in reference to FIGS. 1, 5 and 6 above.

Figure 13:
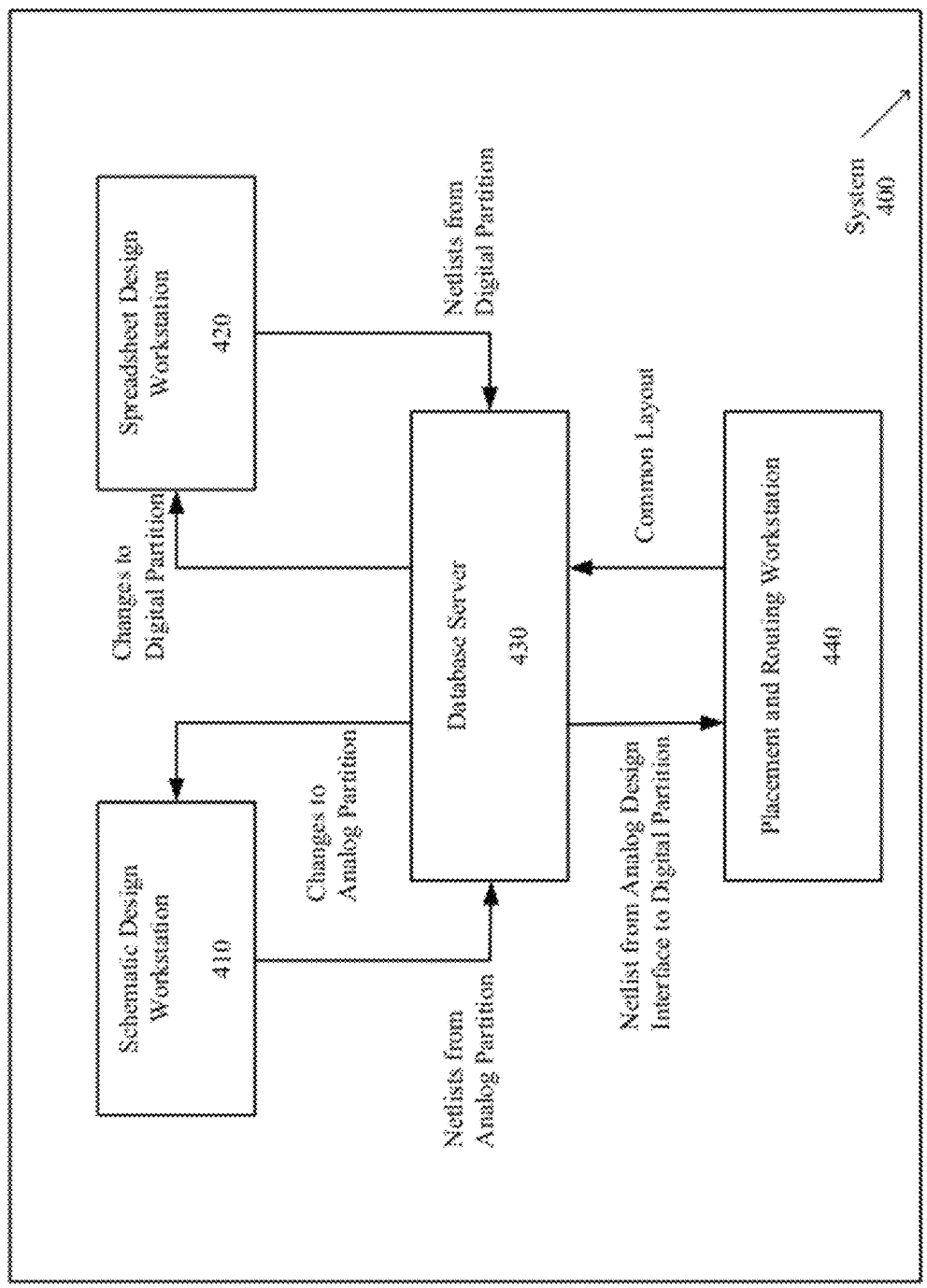
FIG. 13 shows an exemplary block diagram of a system for concurrently designing an electronic circuit across different design entry tools according to an embodiment of the invention.

FIG. 13 shows an exemplary block diagram of a system for concurrently designing an electronic circuit across different design entry tools according to an embodiment of the invention. Referring to FIG. 13, the system 400 includes a schematic design workstation 410, a spreadsheet design workstation 420, a database server 430, and a placement and routing workstation 440. The workstations 410, 420, and 440 may communicate with each other to exchange data via an interconnecting network (not shown), for example, a local area network or a wide area network, or a combination of a local area network and a wide area network. The workstations 410, 420, and 440 may also communicate with each other to exchange data by accessing a shared memory component on the database server 430, for example by reading from and/or writing to a database within the shared memory component in the database server 440. The schematic design workstation 410 and the spreadsheet design workstation can cooperate to concurrently design an electronic circuit, for example a mixed SiP circuit after the design of the mixed signal SiP circuit has been logically partitioned, as shown in FIG. 2 above, into a first partition that includes an analog partition 100 of the mixed SiP circuit, and a second partition that includes a digital partition 200 of the mixed SiP circuit.

In an embodiment, the computer program loaded into the internal memory of the schematic design workstation 410 or the spreadsheet design workstation includes an input software section responsive to input data to specify interfaces in the form of a partition net 300 specifying how the modules in the first partition 100 connect to modules in the second partition 200. For example, the input software section causes the computer system to gather data inputted by a user via a graphical user interface (GUI) or provided through a data file, e.g. an extensible markup language (XML) file, to represent the interfaces.

Referring to FIGS. 2 and 13, the schematic design workstation 410 and the spreadsheet design workstation are inputted with interfaces in the form of a partition net 300 specifying how the modules in the first partition 100 connect to modules in the second partition 200. Each of the schematic and the spreadsheet design workstations can generate a netlist corresponding to the partition net 300 by specifying the output and input ports 311 and 322 from the analog partition 100, the input and output ports 312 and 323 from the digital partition 200 and the interconnection between the analog output port 311 to the digital input port 312, and the interconnection between the analog input port 322 and the digital output port 323.

The schematic design workstation 410 and the spreadsheet design workstation 420 communicate with each other to resolve constraints applied on the partition net 300 in their respective design entry tools. For example, any constraint applied on the partition net 300 in the schematic design workstation 410 is resolved against any conflicting constraint applied on the partition net 300 in the spreadsheet design workstation 420. In an embodiment, software sections loaded into the respective internal memories of the spreadsheet design workstation 420 and the schematic design workstation 410, respectively, communicate with each other, for example, via shared memory accesses or remote procedure calls.

Figure 14:
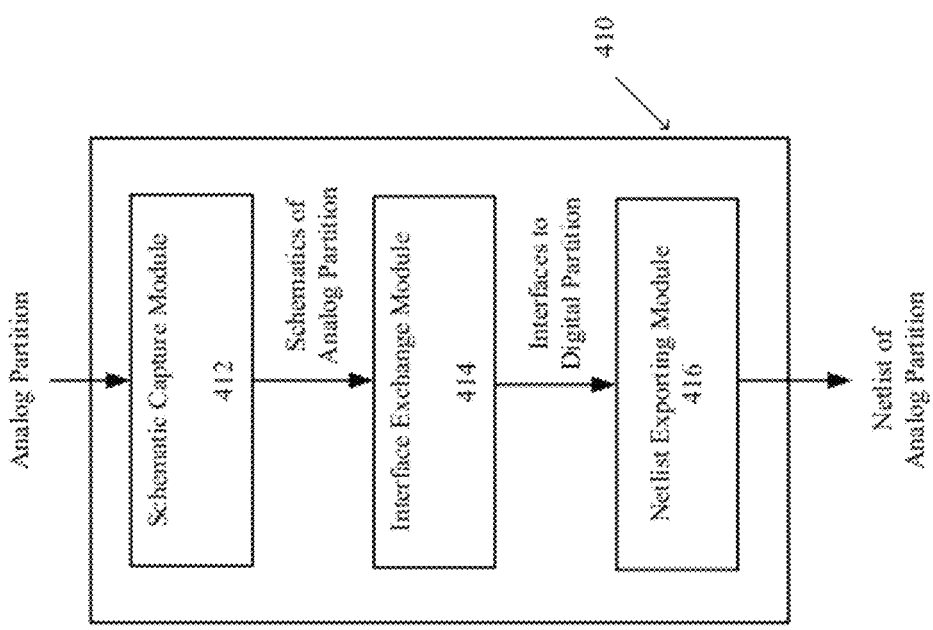
FIG. 14 shows an exemplary block diagram of a first design workstation according to an embodiment of the invention.

FIG. 14 shows an exemplary block diagram of a first design workstation according to an embodiment of the invention. Referring to FIG. 14, the schematic design workstation 410 includes a schematic capture module 412, an interface exchange module 414 and a netlist exporting module 416. The schematic capture module 412 includes one or more schematic design entry tool for capturing electronic components and graphically display the interconnection between the electronic components for easy understanding and conceptualization of the design. The schematic capture module 412 in the schematic design workstation 410 responds to user input to capture analog modules to be incorporated into the design of the analog partition 100 of the mixed SiP circuit and to be interconnected to form the analog partition 100 of the mixed SiP circuit. The analog modules may include for example antenna, a duplexing switch, and latching networks. The schematic capture module 412 may include one or more software section which is loaded into the internal memory of the schematic design workstation 410 to capture the analog modules in response to the user's inputs.

Referring to FIGS. 3 and 14, the schematic design workstation 410 is inputted with the analog modules that form the analog partition 100 of the mixed signal SiP circuit using the schematic design entry tool included in the schematic capture module 412. The analog modules in the analog partition 100 may include an input/output section 110, a duplexing switch 120, and latching networks 130. The schematic design entry tool is also inputted with attributes for the analog partition 100. Then, the schematic design workstation 410 allocates in its own local memory (not shown) an area for locally storing the partition connector 301.

Referring to FIGS. 5 and 14, the interface exchange module 414 in the schematic design workstation 410 exchange interfaces with the interface exchange module 424 in the spreadsheet design workstation 420. The interface exchange module 414 may include one or more interface exchange software section which is loaded into the internal memory of the schematic design workstation 410 to allocate a place holder for the digital interface. In accordance with step 42 of the first interface exchange stage of FIG. 5, the interface exchange module 414 in the schematic design workstation 410 allocates the place holder for the digital interface, for example, in a shared memory area of the database server 430 accessible to both workstations 410 and 420. The place holder is symbolically represented by the partition connector to digital partition 301 in FIG. 3.

In accordance with step 44 of the first interface exchange stage shown in FIG. 5, the interface exchange module 414 in the schematic design workstation 410 populates a corresponding place holder for the analog interface allocated in the shared memory area of the database server 430 by the interface exchange module 424 in the spreadsheet design workstation 420. The place holder for the analog interface is symbolically represented by the partition connector to analog partition 302 in FIG. 4.

In accordance with step 46 of the first interface exchange stage shown in FIG. 5, the schematic design workstation 410 imports the then-populated digital interface into the analog partition 100 to complete the design of the analog partition 100.

Referring to FIGS. 8 and 14, the netlist exporting module 416 in the schematic design workstation 410 exports a netlist of the analog partition 100 to common layout by writing to the shared memory of in the database server 430. The netlist exporting module 416 may include one or more netlist exporting software section which is loaded into the internal memory of the schematic design workstation 410 to export the netlist of the analog partition 100. The netlist exported by the schematic design workstation 410 is a representation of the interconnection of the electronic components in the analog partition 100, as shown by the partial layout in FIG. 8. The schematic design workstation 410 exports the analog partition 100 asynchronously to the common layout 350. The digital partition 200 is represented in this initial common layout 350 by an empty block to signify that that the digital components of the digital partition 200 have not been exported to the common layout 350 by the spreadsheet design workstation 420.

Figure 15:
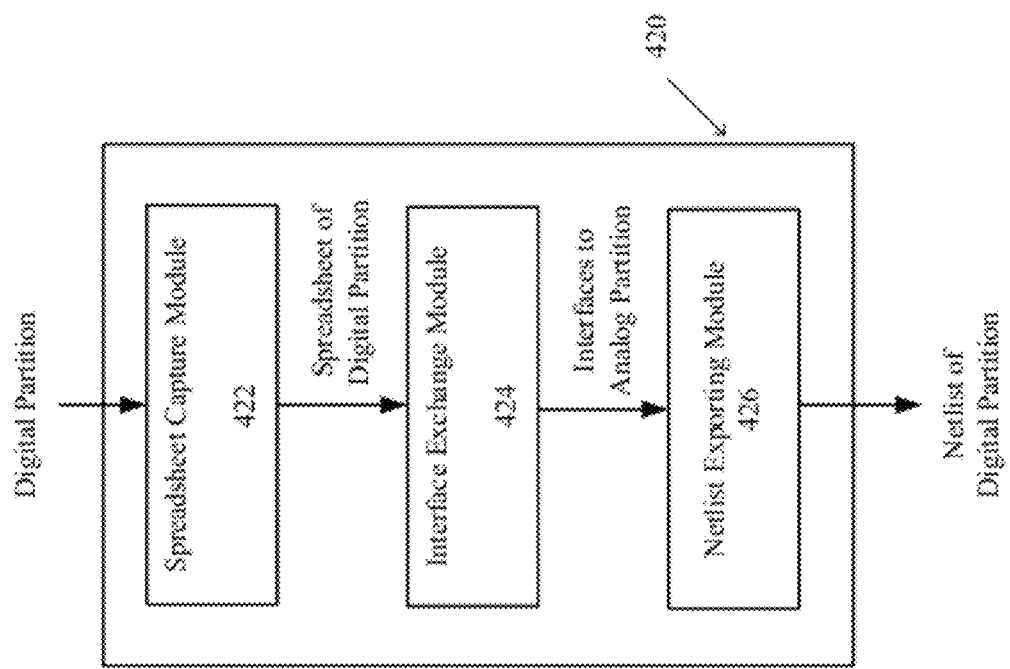
FIG. 15 shows an exemplary block diagram of a second design workstation according to an embodiment of the invention.

FIG. 15 shows an exemplary block diagram of a second exemplary design workstation according to an embodiment of the invention. Referring to FIG. 15, the spreadsheet design workstation 420 includes a spreadsheet capture module 422, an interface exchange module 424 and a netlist exporting module 426. The spreadsheet capture module 422 is includes one or more spreadsheet design entry tool suitable for capturing in spreadsheet form the interconnections between electronic modules having large number of input pins and output pins. The spreadsheet capture module 422 in the spreadsheet design workstation 420 responds to user input to capture digital modules that are to be incorporated and interconnected to form the digital partition 200 of the mixed SiP circuit. The digital partition 200 may include for example several integrated circuits (ICs) interconnected via BGA pins. The spreadsheet capture module 422 may include one or more software section which is loaded into the internal memory of the spreadsheet design workstation 420 to capture the digital modules in response to the user's inputs.

Referring to FIGS. 4 and 15, the spreadsheet design workstation 420 is also inputted with the elements in the digital partition 200 from the mixed signal SiP circuit using the spreadsheet-style design entry tool included in the spreadsheet capture module 422. The spreadsheet design workstation 420 generates a spreadsheet of the digital partition 200 by listing the components that form the digital portion 200 of the mixed SiP circuit, including a RF IC 220, an AMS IC 230, BGA pins 240 to be connected to input/output ports of the AMS IC 230, and bypass capacitors 250 to be interposed between the RF IC 220 and other embedded devices (not shown). The spreadsheet design workstation 420 allocates in its own local memory (not shown) an area for locally storing the partition connector 302.

Referring to FIGS. 6 and 15, the interface exchange module 424 in the spreadsheet design workstation 420 exchange interfaces with the interface exchange module 414 in the schematic design workstation 410. The interface exchange module 424 may include one or more interface exchange software section which is loaded into the internal memory of the spreadsheet design workstation 420 to exchange interfaces with the interface exchange module 414. In accordance with step 52 of the second interface exchange stage shown in FIG. 6, the interface exchange module 424 in the spreadsheet design workstation 420 also allocates a place holder for the analog interface in the shared memory area of the database server 430. The place holder for the analog interface is symbolically represented by the partition connector to analog partition 302 in FIG. 4.

In accordance with step 54 of the second interface exchange stage of FIG. 6, interface exchange module 424 populates the corresponding place holder for the digital interface allocated in the shared memory of the database server 430 by the interface exchange module 414 and symbolically represented by the partition connector to digital partition 301 in FIG. 3.

In accordance with step 56 of the second interface exchange stage of FIG. 6, the spreadsheet design workstation 420 imports the then-populated analog interface into the digital partition 200 to complete the design of the digital partition 200.

Referring to FIGS. 10 and 15, the netlist exporting module 426 in the spreadsheet design workstation exports a netlist of the digital partition 200 to common layout by writing to the shared memory in the database server 430. The netlist exporting module 426 may include one or more netlist exporting software section which is loaded into the internal memory of the spreadsheet design workstation 420 to export the netlist of the digital partition 200. The netlist exported by the spreadsheet design workstation 420 is a representation of the interconnection of the electronic components in the digital partition 200, as shown in FIG. 10. The spreadsheet design workstation 420 exports the digital partition 200 asynchronously to the common layout 350. The analog partition 100 is represented in this initial common layout 350 by an empty block to signify that that the analog components of the analog partition 100 have not been exported to the common layout 350 by the schematic design workstation 410.

Referring back to FIGS. 11 and 13, the schematic design workstation 410 has asynchronously exported the analog partition 100 of the mixed SiP circuit to the common layout 350. Similarly, spreadsheet design workstation 420 has asynchronously exported the digital partition 200 to the common layout 350. The design workstations 410 and 420 also exports their corresponding interfaces to the common layout 350 to fully specify the partition net 300 that describes how the analog partition 100 and the digital partition 200 are interconnected to each other.

Referring back to FIGS. 12 and 13, the placement and routing workstation 440 proceeds with placing and routing the first and second partitions in the common layout 350. The placement and routing tool will decide on the location of the different analog and digital components on the mixed SiP circuit. The placement and routing tool will also complete the pin assignment for the IC modules taking into consideration for how the placement of the IC modules might affect or be affected by the placement and routing of other components on the mixed SiP circuit. For example, the placement and routing tool may modify the location of the input/output section 110 and of the duplexing switch 120 on the common layout 350. Moreover, the placement and routing tool may change the routing of interfaces between the latching networks 130 and the RF IC 323, between the RF IC 220 and the AMS IC 230, and between AMS IC 230 and the BGA pins 240, for example. Furthermore, the placement and routing tool may change the shape of the wiring between the AMS IC 230 and the bypass capacitors 250 to improve routability. The placement and routing may also swap pins within anyone of the AMS IC 230 and the RF IC 220 to further improve routability. Then, the placement and routing workstation 440 writes the common layout 350 to the shared memory of the database server 430.

Still referring to FIGS. 12 and 13, each of the design workstations 410 and 420 performs a layout-versus-schematic synch up of the analog and digital partitions 100 and 200, respectively, with the common layout 350. Each of the design entry tools 410 and 420 checks whether the placement and routing processes have changed instances of any of the first and second electronic components, or changed connectivity between any of the first and second electronic components in the common layout. If any change is detected in the analog partition 100 of the common layout 350, the schematic design workstation updates the analog partition 100 to reflect instances and connectivity changes in the analog partition 100 from the common layout 350. Similarly, the spreadsheet design workstation 420 updates the digital partition 200 to reflect instances and connectivity changes in the digital partition 200 from the common layout 350.

According to an embodiment of the invention, the schematic design workstation 410, the spreadsheet design workstation 420 and the placement and routing workstation 440 are distributed over local and wide area networks and exchange data and information by writing to a shared memory provided in a database server also in the local and/or wide area network. According to another embodiment of the invention, the schematic design workstation 410, the spreadsheet design workstation 420 and the placement and routing workstation 440 can directly communication with each other via network based remote procedure calls or any protocol for exchanging data and information over a network between network workstations. According to yet another embodiment of the invention, two or more of the schematic design workstation 410, the spreadsheet design workstation 420 and the placement and routing workstation 440 may be consolidated within a single design, placement and routing server accessible via network terminals by different teams working independently to generate a common layout.

Figure 16:
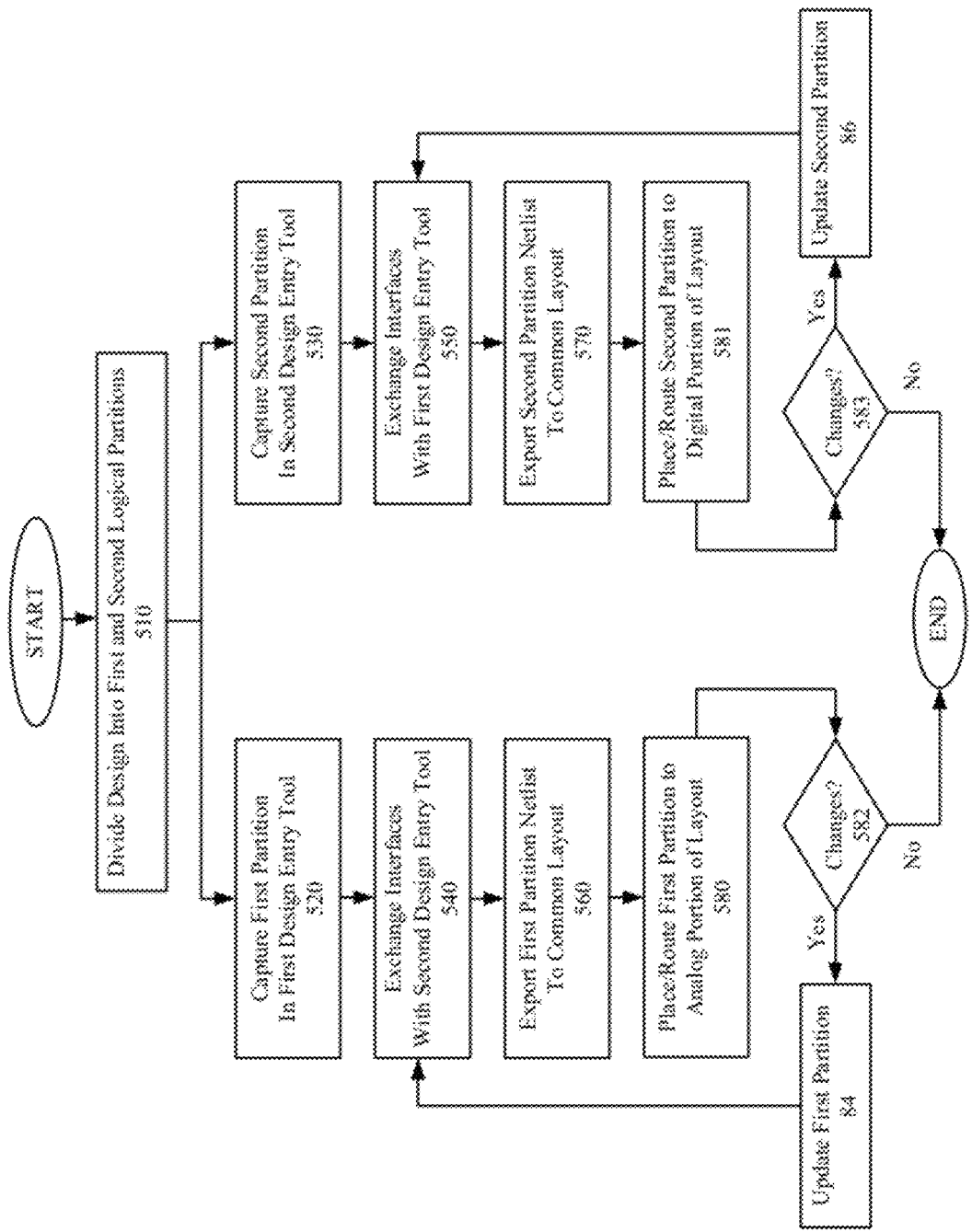
FIG. 16 shows an exemplary flowchart illustrating another method for concurrently designing an electronic circuit across different design entry tools according to another embodiment of the invention.

FIG. 16 shows an exemplary flowchart illustrating another method for concurrently designing an electronic circuit across different design entry tools according to another embodiment of the invention. Referring to FIG. 16, the design of an electronic circuit, such as a mixed signal SiP, is divided into at least first and second logical partitions at an initial design stage 510. At this initial design stage 510, interfaces are defined to provide for connectivity between the first and the second partitions. An exemplary logical partitioning of the design of a mixed signal SiP circuit is shown in FIG. 2 above.

The design of the electronic circuit includes a first capture stage 520 for capturing the first partition in the first design entry tool. At this first capture stage 520, the first electronic components that constitute the first partition are entered in the first design entry tool. Then, the first electronic components are interconnected to complete the first partition. An exemplary block diagram of the analog partition of the mixed signal SiP circuit is shown in FIG. 3.

The design of the electronic circuit includes a second capture stage 530 for capturing the second partition in the second design entry tool. The second capture stage 530 may occur concurrently with the first capture stage 520. At this second capture stage 530, the second electronic components that constitute the second partition are entered in the second design entry tool. Then, the second electronic components are interconnected to complete the second partition. An exemplary block diagram of the digital partition of the mixed signal SiP circuit is shown in FIG. 4.

The design of the electronic circuit includes a first interface exchange stage 540 for exchanging interfaces from the first design entry tool to the second entry tool and a second interface exchange stage 550 for exchanging interfaces from the second design entry tool to the first design entry tool. At the first interface exchange stage 540, the first design exports a second-to-first interface to the second design entry tool and imports a first-to-second interface from the second design entry tool into the first partition. Reciprocally, at the second interface exchange stage 550, the second design entry tool exports the first-to-second interface to the first design entry tool and imports the first-to-second interface into the second partition.

Still referring back to FIG. 16, the design of the electronic circuit includes a first netlist export stage 560 for exporting a first netlist of the first partition to an analog portion of a common layout. At the first netlist export stage 560, the first electronic components that constitute the first partition have been interconnected in the first design entry tool. The first netlist exported by the first partition is a representation of the interconnection of the first electronic components in the first partition. An exemplary schematic diagram of the analog partition captured by the schematic design entry tool is shown in FIG. 7. An exemplary block diagram of a partial layout representing the analog partition exported by the first design entry tool is shown in FIG. 8.

The design of the electronic circuit includes a second netlist export stage 570 for exporting a second netlist of the second partition to a digital portion of the common layout. At this stage 570, the second electronic components that constitute the second partition have been interconnected in the second design entry tool. The second netlist exported by the second partition is a representation of the interconnection of the second electronic components in the second partition. An exemplary spreadsheet of the digital partition captured by a spreadsheet design entry tool is shown in FIG. 9. An exemplary block diagram of a partial layout representing the digital partition exported by the second design entry tool is shown in FIG. 10. FIG. 11 is an exemplary block diagram of the common layout after both design entry tools have exported the analog and digital partitions, respectively.

Still referring back to FIG. 16, the design of the electronic circuit includes a first placing and routing stage 580 for placing and routing the first partition in the common layout. At this stage 580, the analog portion of the common layout from the first design entry tool can be processed using a first placement and routing tool to place the first electronic components and route the wires interconnecting the first electronic components. The first electronic components are placed in a first portion of the common layout allocated to the analog partition.

The design of the electronic circuit further includes a second placing and routing stage 581 for placing and routing the second partition in the common layout. At this stage 581, the digital portion of the common layout from the second design entry tool can be processed using a second placement and routing tool to place the second electronic components and route the wires interconnecting the second electronic components. The second electronic components are placed in a second portion of the common layout allocated to the digital partition. Once both analog and digital portions of the common layout have been placed, anyone of the placement and routing tools can be used to complete the routing of the wires interconnecting the first and second electronic components.

Figure 17:
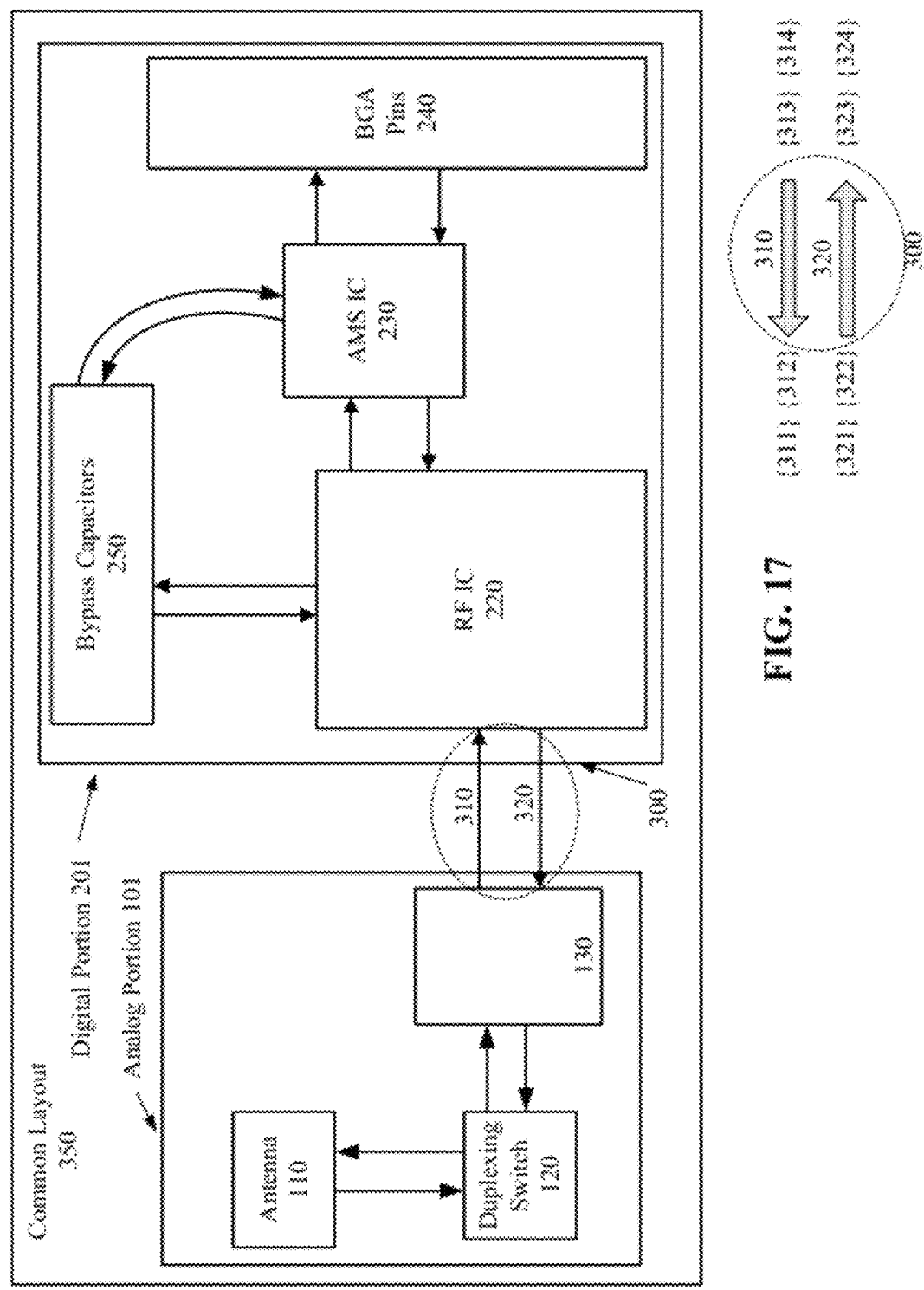
FIG. 17 is an exemplary block diagram of a placement and routing within separate portions of a common layout according to an embodiment of the invention.

FIG. 17 is an exemplary block diagram of a placement and routing within separate portions of a common layout according to an embodiment of the invention. Referring to FIG. 17, the analog components exported by the first design entry tool are placed and routed using the first placement and routing tool. The first placement and routing tool will decide on the location of the different analog components within an analog portion 101 allocated for the analog partition 100 on the mixed SiP circuit. The placement and routing tool may modify the location of the input/output section 110 and of the duplexing switch 120 on the common layout 350. Moreover, the first placement and routing tool may change the routing of interfaces between the latching networks 130, for example.

The digital components exported by the second design entry tools are placed and routed using a second placement and routing tool. The second placement and routing tool will decide on the location of the different analog components within a digital portion 201 allocated for the digital partition 200 on the mixed SiP circuit. The second placement and routing tool may change the routing of interfaces between the latching networks 130 and the RF IC 323, between the RF IC 220 and the AMS IC 230, and between AMS IC 230 and the BGA pins 240, for example. Moreover, the placement and routing tool may change the shape of the wiring between the AMS IC 230 and the bypass capacitors 250 to improve routability. The placement and routing may also swap pins within anyone of the AMS IC 230 and the RF IC 220 to further improve routability.

In an embodiment as shown in FIG. 17, the analog portion 101 of the common layout 350 is physically separate from the digital portion 201, thereby forming separate rooms in the common layout for the analog and digital teams to work to independently and concurrently design their respective partitions.

Referring back to FIG. 16, the design of the electronic circuit includes a first layout synchronization stage 582 to perform a layout-versus-schematic synch up of the first partition with the common layout. At this stage 582, the first design entry tool checks whether the placement and routing processes have changed instances of any of the first electronic components, or changed connectivity between any of the first components or between a first component and a second component in the common layout 350. If any change is detected at design stage 582, the first design entry tool updates the first partition at a first update stage 84 to reflect instances and connectivity changes in the first partition in view of the placement and routing in the analog portion 101 of the common layout 350.

The design of the electronic circuit includes a second layout synchronization stage 583 to perform a layout-versus-schematic synch up of the second partition with the common layout. At this stage 582, the first design entry tool checks whether the placement and routing processes have changed instances of any of the second electronic components, or changed connectivity between any of the second components or between a first component and a second component in the common layout 350. If any change is detected at design stage 583, the second design entry tool updates the second partition at a second update stage 86 to reflect instances and connectivity changes to the second partition in view of the placement and routing in the digital portion 201 of the common layout.

According to an embodiment of the invention, a design entry tool writes to the common layout 350 to create or update the design of components of a partition by accessing a shared file representing the common layout 350 or updating a database object corresponding to the common layout 350. Each design team has read the entire layout 350, including portions of the layout written by other design teams. Each design team may also write to the common layout 350, and may modify or delete items that it has already written to the layout 350. However, a design team may not modify or delete items written to the layout by other teams. Thus, each design team can work independently without interference by other design teams.

According to an embodiment of the invention as shown in FIG. 16, each design entry tool writes to a separate portion of the common layout 350 to create or update the design of components of a partition by accessing a shared file representing the common layout 350 or updating a database object corresponding to the common layout 350. The analog design team may write to the analog portion 101 of common layout 350, and may modify or delete items that it has already written to the analog portion 101 of the common layout 350. The digital design team may write to the digital portion 201 of the common layout 350, and may modify or delete items that it has already written to the digital portion 201 of the common layout 350. Thus, each design team can work independently without interference by other design teams.

According to an embodiment of the invention, the design of an electronic circuit is divided into partitions, and interfaces are exchanged between design entry tools to enable communication between the partitions, and the different design entry tools write asynchronously into a common layout. Each design team enters components in its own partition and exports the netlist describing the interconnections of the components in the corresponding partition according to design criteria specific to the partition. One or all of design entry tools exports a partition net describing the interconnection between the respective partitions, thereby stitching together the netlists exported by the different teams to the common layout. Then, instances and connectivity changes in the common layout are updated in the respective partitions.

In an embodiments of the invention, the design entry tool for capturing the analog partition 100 includes a schematic design entry tool and the design entry tool for capturing the digital partition 200 includes a spreadsheet environment design entry tool. In another embodiment of the invention, the analog and digital partitions 100 and 200 and additional partitions in the circuit to be designed are all captured using the same design entry tool, for example, in a spreadsheet environment design entry tool. In still another embodiment of the invention, other design entry tools may be alone or in combination with schematic design entry tools and spreadsheet design tools to capture the several partitions into which a design may be divided.

It will be apparent to those skilled in the art that various modifications and variations can be made in embodiments of concurrent design and simulation of modules across different design entry tools targeted to single layout without departing from the spirit or scope of the invention. Thus, it is intended that embodiments of the invention cover the modifications and variations of this invention provided they come within the scope of the appended claims and their equivalents.

What is claimed is:

1. A method of concurrently generating a layout for an electronic circuit across a plurality of design entry tools, comprising:
   capturing, using one or more computing devices, a first plurality of first electronic components in a first design entry tool;
   capturing, using one or more computing devices, a second plurality of second electronic components in a second design entry tool;
   providing, using one or more computing devices, at least a first interface from the first plurality to the second plurality in the first design entry tool;
   populating, using one or more computing devices, the first interface through the second design entry tool;
   exporting, one or more computing devices, a first netlist representing a first interconnection of the first electronic components in the layout from the first design entry tool;
   exporting, using one or more computing devices, a second netlist representing a second interconnection of the second electronic components in the layout from the second design entry tool; and
   exporting, one or more computing devices, a third netlist representing the first interface from the first plurality to the second plurality from the first design entry tool, wherein the third netlist stitches the first netlist to the second netlist.

2. The method of claim 1, wherein the exporting of the first netlist from the first design entry tool is asynchronous from the exporting of the second netlist from the second design entry tool.

3. The method of claim 1, further comprising placing and routing the first and second electronic components in accordance with stitching of the first and second netlists by the third netlist.

4. The method of claim 3, further comprising updating the first interconnection of the first electronic components in accordance with a change in at least one of the placing of the first electronic components in the layout and the routing of the first electronic components in the layout.

5. The method of claim 3, further comprising updating the second interconnection of the second electronic components in accordance with a change in at least one of the placing of the second electronic components in the layout and the routing of the second electronic components in the layout.

6. The method of claim 3, wherein the placing and routing of the first electronic components use different floorplan and routing rules than the placing and routing of the second electronic components.

7. The method of claim 1, wherein the first electronic components are related to a first characteristic of the electronic circuit and the second electronic components are related to a second characteristic of the electronic circuit.

8. The method of claim 7, wherein the first electronic components form an analog part of the electronic circuit and the second electronic components form a digital part of the electronic circuit.

9. The method of claim 1, wherein the first design entry tool includes a schematic design entry tool that captures the first electronic components in a schematics and the second design entry tool includes a spreadsheet design entry tool that captures the second electronic components in a spreadsheet.

10. The method of claim 1, further comprising:
providing at least a second interface from the second plurality to the first plurality in the second design entry tool;
populating the second interface through the first design entry tool; and
exporting a fourth netlist representing the second interface from the second plurality to the first plurality from the second design entry tool, wherein the fourth netlist stitches the first netlist to the second netlist.

11. A method of interconnecting a first plurality of electronic components and a second plurality of electronic components to form an electronic circuit, comprising:
exporting, one or more computing devices, a first netlist representing a first interconnection of the first electronic components in a first design entry tool;
exporting, one or more computing devices, a second netlist representing a second interconnection of the second electronic components in a second design entry tool;
providing, using one or more computing devices, at least a first interface from the second plurality to the first plurality in the second design entry tool;
populating, using one or more computing devices, the first interface through the first design entry tool; and
exporting, one or more computing devices, a third netlist representing the first interface from the second plurality to the first plurality from the second design entry tool, wherein the third netlist stitches the first netlist to the second netlist.

12. The method of claim 11, further comprising:
providing at least a second interface from the first plurality to the second plurality in the first design entry tool;
populating the second interface through the second design entry tool; and
exporting a fourth netlist representing the second interface from the first plurality to the second plurality from the first design entry tool, wherein the fourth netlist stitches the first netlist to the second netlist.

13. A system for generating a layout for an electronic circuit, comprising:
a first design workstation having a first capture module that captures a first plurality of first electronic components;
a second design workstation having a second capture module that captures a second plurality of second electronic components;
a first interface exchange module in the first design workstation that provides at least a first interface from the first plurality to the second plurality;
a second interface exchange module in the second design workstation that populates the first interface;
a first netlist exporting module in the first design workstation that exports a first netlist representing a first interconnection of the first electronic components in the layout from the first capture module; and
a second netlist exporting module in the second design workstation that exports a second netlist representing a second interconnection of the second electronic components in the layout from the second capture module,
wherein the first netlist exporting module exports a third netlist representing the first interface from the first plurality to the second plurality to stitch the first netlist to the second netlist.

14. The system of claim 13, wherein the first and second netlist exporting modules asynchronously export the first and second netlists, respectively.

15. The system of claim 13, further comprising a placement and routing workstation in a communicative relation with the first and second workstation to place and route the first and second electronic components in accordance with the first and second netlists stitched by the third netlist.

16. The system of claim 15, wherein the first design workstation updates the first interconnection of the first electronic components in accordance with a change in at least one of the placement of the first electronic components in the layout and the routing of the first electronic components in the layout.

17. The system of claim 15, wherein the second design workstation updates the second interconnection of the second electronic components in accordance with a change in at least one of the placement of the second electronic components in the layout and the routing of the second electronic components in the layout.

18. The system of claim 13, wherein the first electronic components form an analog part of the electronic circuit and the second electronic components form a digital part of the electronic circuit.

19. The system of claim 13, wherein the first capture module includes a schematic design entry tool that captures the first electronic components and the second capture module includes a spreadsheet design entry tool that captures the second electronic components.

20. The system of claim 13, wherein the second interface exchange module in the second design workstation provides at least a second interface from the second plurality to the first plurality,
the first interface exchange module in the first design workstation populates the second interface, and the second netlist exporting module exports a fourth netlist representing the second interface from the second plurality to the first plurality to stitch the first netlist to the second netlist.

21. A non-transitory computer readable medium storing a set of instructions which, when executed by a computer processing system, causes the computer processing system to process input data representing components of an electronic device to generate a layout for an electronic circuit, the set of instructions comprising:
- a first capture section that causes the computer system to capture a first plurality of first electronic components;
- a second capture section that cause the computer system to capture a second plurality of second electronic components;
- a first interface exchange section that provides at least a first interface from the first plurality to the second plurality;
- a second interface exchange section that populates the first interface;
- a first netlist exporting section that causes the computer system to export a first netlist representing a first interconnection of the first electronic components; and
- a second netlist exporting section that causes the computer system to export a second netlist representing a second interconnection of the second electronic components,
- wherein the first netlist exporting section causes the computer system to export a third netlist representing the first interface from the first plurality to the second plurality to stitch the first netlist to the second netlist.

22. The computer readable medium of claim 21, wherein the first and second netlist exporting sections asynchronously export the first and second netlists, respectively.

23. The computer readable medium of claim 21, wherein the set of instructions causes the computer system to place and route the first and second electronic components in accordance with the first and second netlists stitched by the third netlist.

24. The computer readable medium of claim 23, wherein the set of instructions causes the computer system to update the first interconnection of the first electronic components in accordance with a change in at least one of the placement of the first electronic components in the layout and the routing of the first electronic components in the layout.

25. The computer readable medium of claim 23, wherein the set of instructions causes the computer system to update the second interconnection of the second electronic components in accordance with a change in at least one of the placement of the second electronic components in the layout and the routing of the second electronic components in the layout.

26. The computer readable medium of claim 21, wherein the first electronic components form an analog part of the electronic circuit and the second electronic components form a digital part of the electronic circuit.

27. The computer readable medium of claim 21, wherein the first capture section captures the first electronic components in a schematic form and the second capture section captures the second electronic components in a spreadsheet form.

28. The computer readable medium of claim 21, wherein the second interface exchange section provides at least a second interface from the second plurality to the first plurality,
- the first interface exchange section populates the second interface, and
- the second netlist exporting section exports a fourth netlist representing the second interface from the second plurality to the first plurality to stitch the first netlist to the second netlist.

* * * * *